(12) United States Patent
Wei et al.

(10) Patent No.: US 11,022,286 B2
(45) Date of Patent: Jun. 1, 2021

(54) ADJUSTABLE LIGHT STACK

(71) Applicant: Verdant Lighting Technology, Inc., Cypress, TX (US)

(72) Inventors: Yaqui Wei, Cypress, TX (US); Qian Zhang, Cypress, TX (US); Zhun Li, Cypress, TX (US)

(73) Assignee: Verdant Lighting Technology, Inc., Cypress, TX (US)

( * ) Notice: Subject to any disclaimer, the term of this patent is extended or adjusted under 35 U.S.C. 154(b) by 0 days.

(21) Appl. No.: 16/641,208

(22) PCT Filed: Aug. 21, 2018

(86) PCT No.: PCT/US2018/047376
§ 371 (c)(1),
(2) Date: Feb. 21, 2020

(87) PCT Pub. No.: WO2019/040525
PCT Pub. Date: Feb. 28, 2019

(65) Prior Publication Data
US 2020/0224860 A1    Jul. 16, 2020

Related U.S. Application Data

(60) Provisional application No. 62/548,830, filed on Aug. 22, 2017.

(51) Int. Cl.
*F21V 21/30* (2006.01)
*F21V 29/57* (2015.01)
(Continued)

(52) U.S. Cl.
CPC ............ *F21V 21/30* (2013.01); *F21V 5/04* (2013.01); *F21V 23/0471* (2013.01);
(Continued)

(58) Field of Classification Search
None
See application file for complete search history.

(56) References Cited

U.S. PATENT DOCUMENTS

2013/0301256 A1   11/2013   Thomas et al.
2014/0062316 A1   3/2014    Tischler et al.
(Continued)

FOREIGN PATENT DOCUMENTS

WO    2019040525 A1    2/2019

OTHER PUBLICATIONS

International Search Report and Written Opinion; PCT Application No. PCT/US2019/047376; dated Nov. 21, 2018.

*Primary Examiner* — Elmito Breval
(74) *Attorney, Agent, or Firm* — Polsinelli PC

(57) ABSTRACT

A light stack having an elongate body having a length extending from a proximal end to a distal end of the elongate body. A plurality of light emitting diode (LED) arrays adjustably coupled with the elongate body and arranged along the length thereof and a control module coupled with the plurality of LED arrays, wherein the each of the plurality of LED arrays is operable to pivot, thereby forming an angle relative to the elongate body. The control module configured to individually transition each of the plurality of LED arrays between a light emitting condition and a non-light emitting condition. The plurality of LED arrays configured to be adjustable to pivot on an axis at an angle relative to the elongate body.

20 Claims, 21 Drawing Sheets

(51) Int. Cl.
  *H05B 45/31* (2020.01)
  *F21V 5/04* (2006.01)
  *F21V 23/04* (2006.01)
  *F21Y 103/10* (2016.01)
  *F21Y 115/10* (2016.01)

(52) U.S. Cl.
  CPC .......... *F21V 29/57* (2015.01); *H05B 45/31* (2020.01); *F21Y 2103/10* (2016.08); *F21Y 2115/10* (2016.08)

(56) References Cited

U.S. PATENT DOCUMENTS

| | | |
|---|---|---|
| 2014/0185285 A1 | 7/2014 | Jorgensen |
| 2014/0209035 A1 | 7/2014 | Tang et al. |
| 2016/0366746 A1 | 12/2016 | Van De Ven et al. |
| 2017/0055328 A1 | 2/2017 | Law |
| 2019/0191639 A1* | 6/2019 | Hegyi .................. A01G 9/023 |

* cited by examiner

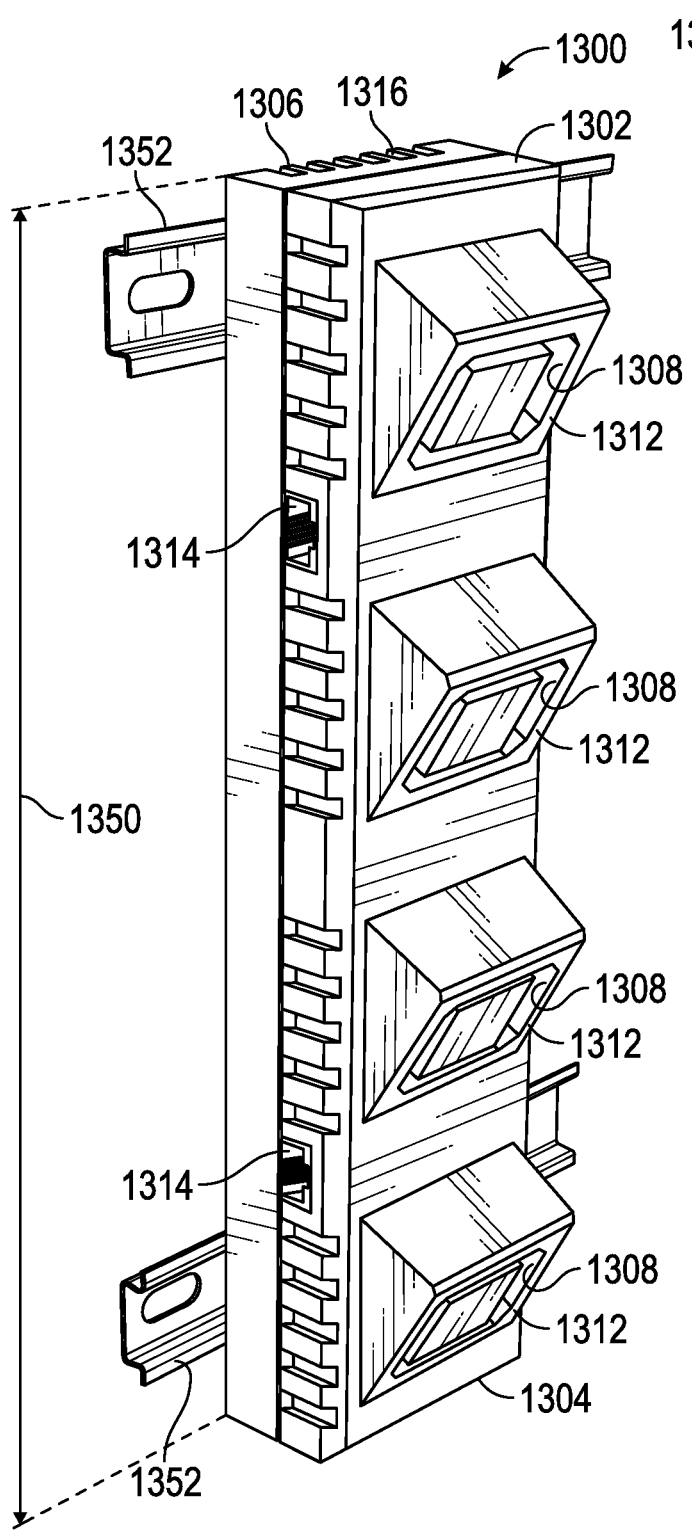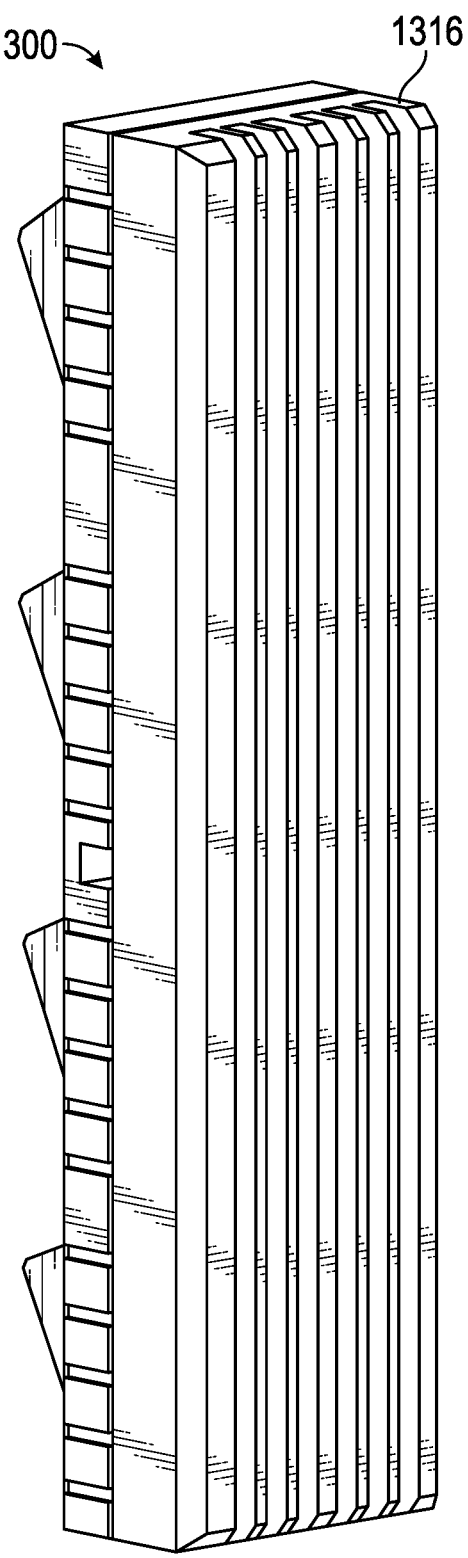
FIG. 13        FIG. 14

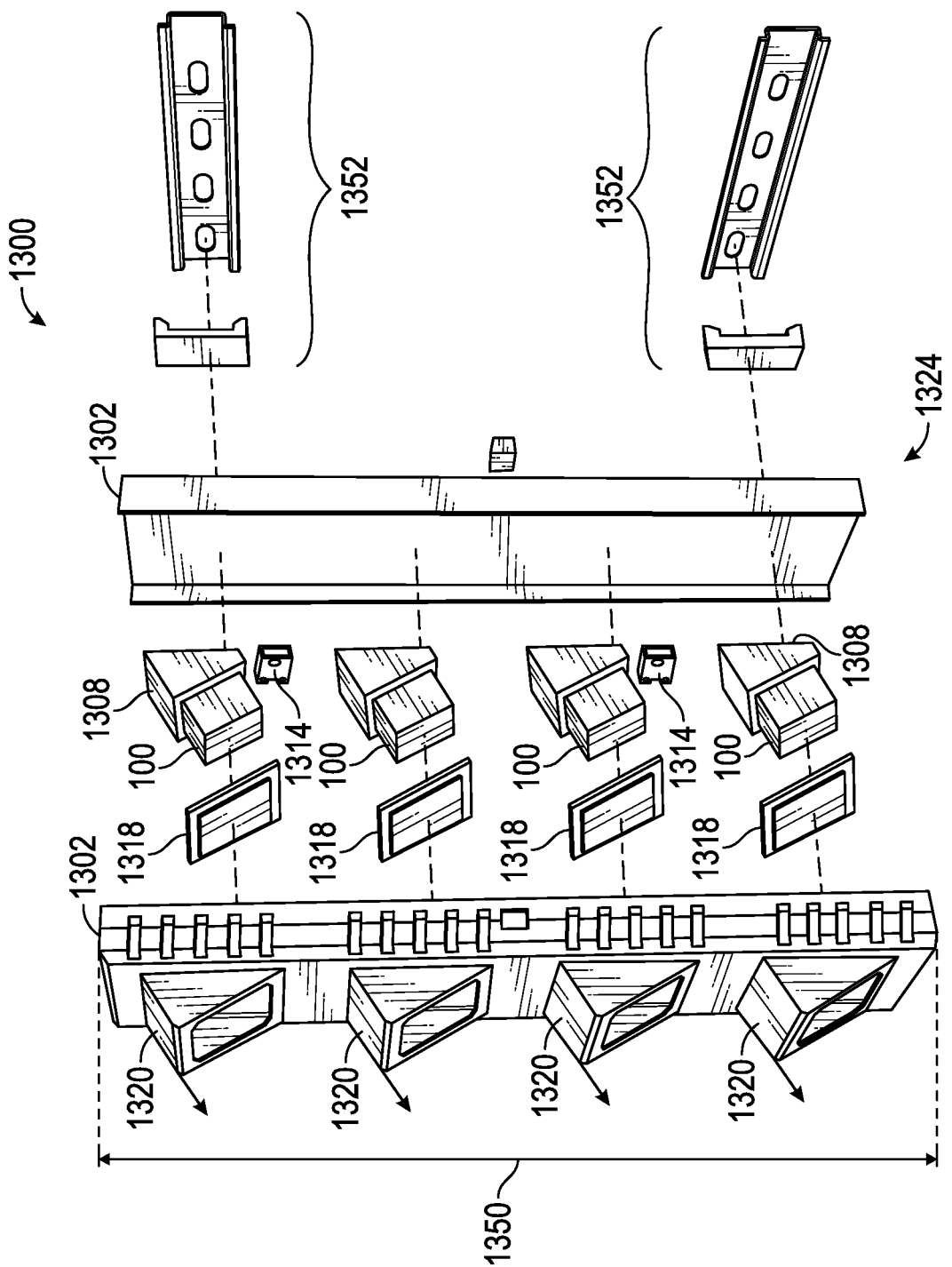

ADJUSTABLE LIGHT STACK

FIELD

The present disclosure relates generally to a light emitting diode (LED) light stack. In particular, the subject matter herein generally relates to a light stack having one or more adjustable lighting systems.

BACKGROUND

Light stack assemblies and system are implemented with a plurality of light sources between an on and an off position. The light stack assemblies have a single power draw setting and cannot be adjusted to reduce energy consumption throughout a life cycle use. Light stacks can be implemented within homes, businesses, or any other environment, but often are energy inefficient due to unnecessary light output during certain times.

BRIEF DESCRIPTION OF THE DRAWINGS

Implementations of the present technology will now be described, by way of example only, with reference to the attached figures, wherein:

FIG. 13 is a front isometric view of a light stack assembly and mounting structure according to the present disclosure;

FIG. 14 is a rear isometric view of a light stack assembly according to the present disclosure;

FIG. 15 is an exploded isometric view of the light stack assembly and mounting structure of FIG. 13 according to the present disclosure.

DETAILED DESCRIPTION

Figure 1:
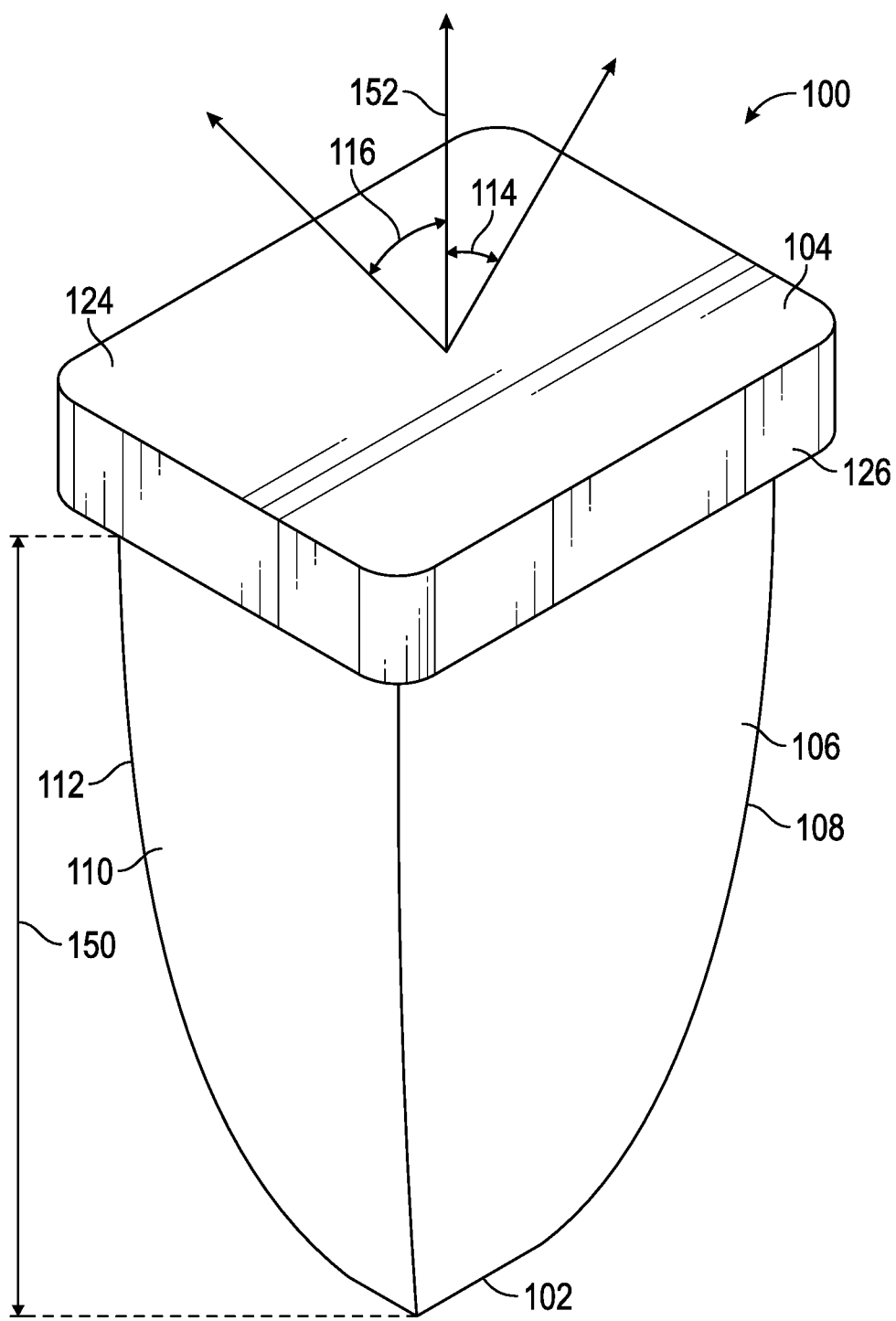
FIG. 1 is an isometric view of a multi-angle lens module according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the example described herein. However, it will be understood by those of ordinary skill in the art that the example described herein can be practiced without these specific details. In other examples, methods, procedures and components have not been described in detail so as not to obscure the related relevant feature being described. Also, the description is not to be considered as limiting the scope of the example described herein. The drawings are not necessarily to scale and the proportions of certain parts have been exaggerated to better illustrate details and features of the present disclosure.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "about" means almost, nearly, on the verge of, or without significant deviation from the numeric representation. The term "comprising" means "including, but not necessarily limited to"; it specifically indicates open-ended inclusion or membership in a so-described combination, group, series and the like.

The term "light source" or "light array" is defined to include any element capable of producing light (visible or invisible to the human eye) including, but not limited to, light emitting diode (LED), compact fluorescent light (CFL), fluorescent, incandescent, and infrared.

The present disclosure is drawn to a light stack assembly having an elongate body having a length extending from a proximal end to a distal end of the elongate body. A plurality of LED arrays can be adjustably coupled with the elongate body and arranged along the length thereof, wherein each of the plurality of LED arrays is operable to pivot, thereby forming an angle relative to the elongate body. A control module can be coupled with the plurality of LED arrays. The control module can be configured to individually transition each of the plurality of LED arrays between a light emitting condition and a non-light emitting condition.

The control module can transition the plurality of LED arrays between the light emitting condition and the non-light emitting condition, whereby the LED array of the plurality of LED arrays adjacent to the proximal end is in a light emitting condition prior to an LED array toward the distal end. The control module can transition a corresponding one of the plurality of LED arrays to a light emitting condition based upon a command received from an external source.

The light stack assembly can further include a plurality of proximity sensors coupled with the control module and arranged along the length of the elongate body. The plurality of proximity sensors can be configured to register an object within a predetermined distance. Each of the plurality of LED arrays can be have a proximity sensor adjacent thereto. The control module can transition the plurality of LED arrays adjacent to any of the plurality of proximity sensors registering an object within the predetermined distance. For example, the plurality of proximity sensors can register an object within the predetermined distance between the proximal end and the middle of the elongate body and the control module can transition, in response, any of the plurality of LED arrays disposed between the proximal end and the middle of the elongate body to a light emitting condition. In another example, the proximity sensors can register an object adjacent to the proximal end of the elongate body and the control module can transition the LED array adjacent to the proximal end from a non-light emitting condition to a light emitting condition.

Each of the plurality of LED arrays can include one or more lens modules. Each of the plurality of LED arrays can be substantially equally spaced from one another along the length of the elongate body. The plurality of LED arrays can be arranged such that a portion are located proximate a proximal end and a portion are located proximate a distal end. The portion of the plurality of LED arrays at a proximal end can be spaced closer together than the portion of the plurality of LED arrays at a distal end of the elongate body. The plurality of LED arrays can be located on one side of the elongate body. The plurality of LED arrays can be located on two or more side of the elongate body. In one example, LED arrays can be located on four or more sides of the elongate body.

The control module can transition each of the plurality of LED arrays from a non-light emitting condition to the light emitting condition after a predetermined length of time. The predetermined length of time can be different for each of the plurality of LED arrays. The plurality of LED arrays can be angled relative to the elongate body. The angle can be between 15 degrees and 60 degrees, and more specifically about 30 degrees.

An angled lens can be coupled to the elongate body can be coupled to the elongate body and an emitting surface of the angled lens can form an angle relative to the elongate body.

The plurality of LED arrays can also include a cooling assembly having a cooling plate and a port, wherein the cooling plate is configured to receive a cooling liquid via the cooling port. The plurality of LED arrays can include a housing that is configured to be coupled to the cooling plate. The cooling plate has a thickness through which one or more water passages are formed extending from the cooling port to an exit port. In at least one example, the cooling port is located on a side of the cooling plate and the exit port can be located on a side opposite of the side on which the cooling port is mounted.

The light stack assembly can also include a plurality of controllers, wherein each controller corresponds to each of the plurality of LED arrays and are positioned along the length of the elongate body. Each of the plurality of controllers can communicate with each corresponding LED array of the plurality of LED arrays. In one example the communication can be via a pair of pin connectors, wherein a first pin connector is positioned on the LED array and a second pin connector is positioned on the controller. In other examples, the communication can be though a wireless connector.

The light stack can also include a support structure having a pair of frames coupled to the elongate body, wherein each frame has a receiver protruding from the bottom of the frame and the receiver can have an open slot. Each frame can also have a curvilinear limb, wherein the curvilinear limb can protrude from the top of the frame further than the receiver and can curve towards the receiver. The curvilinear limb can also have a corresponding curvilinear closed slot.

The light stack can also include a plurality of cooling plates coupled to a corresponding one of the plurality LED arrays, a rod, and a second rod, wherein the plurality of cooling plates has a first bore configured to receive the rod and a second bore configured to receive the second rod. The rod can extend past the first bore 1916 on both ends of the cooling plate such that the extended portions can be received by a corresponding open slot of each frame. The second rod can have a first threaded end and a second threaded end, which can extend past the second bore, wherein the first threaded end and the second threaded end can be received by a corresponding curvilinear closed slot of each frame. The light stack can also include a first cap and a second cap, wherein the first cap can be configured to screw onto the first threaded end and the second cap can be configured to screw onto the second threaded end.

A multi-angle lens module is described with respect to FIGS. 1-7 and a lighting system and light control apparatus are described with respect to FIGS. 8-12. In at least one example, the multi-angle lens module described in FIGS. 1-7 can be implemented with the light control system and light control apparatus as described with respect to FIGS. 8-12 and collectively housed within a light stack assembly as described with respect to FIGS. 13-17.

The following provides a more detailed discussion of the multi-angled lens module, light control system, and light control apparatus with reference to the following figures.

FIG. 1 is an isometric view of a multi-angle lens module according to the present disclosure. The lens module 100 can have a light receiving area 102 (shown more clearly in FIG. 2) and a light emitting area 104. The light receiving area 102 and light emitting area 104 can be substantially parallel and separated by a predetermined distance 150. The lens module 100 can also include a first set of sidewalls 106 and a second set of sidewalls 110, each extending from the light receiving area 102. The first set of sidewalls 106 can be substantially parallel to one another, and the second set of sidewalls 110 can similarly be substantially parallel to one another.

The first set of sidewalls 106 can have a contour portion 108 extending from the light receiving area 102. The first set of sidewalls 106 extend extending the predetermined distance 150 between the light receiving area 102 and the light emitting area 104. The second set of sidewalls 110 can have a contour portion 112 extending from the light receiving area 102 and extending at least a portion of the predetermined distance 150.

The first set of sidewalls 106 generate a first reflection angle 114 of emitted light relative to a normal vector 152 extending from the light emitting area 104 and the second set of sidewalls 110 generate a second reflection angle 116 emitted light relative to the normal vector 152.

Each of the first set of sidewalls 106 and the second set of sidewalls 110 can have an inner surface 118 and an outer surface 120. The inner surface 118 can have the contour portion 108, 112, respectively. The inner surface 118 can be reflective and/or have a reflective coating configured reflect light from the contour portion 108, 112, respectively.

In at least one example, the lens module 100 is formed from a metal that has a high reflective index, for example aluminum. In another example, the lens module 100 can be polished to maximize light reflectiveness of the inner surface 118. In other example, the lens module can be molded, extruded, or otherwise formed from plastic and the inner surface 118 of the lens module 100 can be coated with a reflective film, for example aluminum foil, to increase the inner surface 118 reflectiveness.

The outer surface 120 can mirror the contour portion 108, 112, respectively, or be formed in any other shape. In at least one example, the outer surface 120 is substantially vertical while the inner surface 118 has the contour portion 108, 112. The thickness of the first set of sidewalls 106 and the second set of sidewalls 110 can vary between the inner surface 118 and the outer surface 120 along the contour portion 108, 112 depending on the arrangement of the outer surface 120, or be substantially the same depending on the arrangement of the inner surface and outer surface.

The lens module 100 can be extruded, molded, milled, or otherwise formed from any number of materials including, but not limited to, polymers, composites, metals, resins, wood, and/or any combination thereof.

Figure 2:
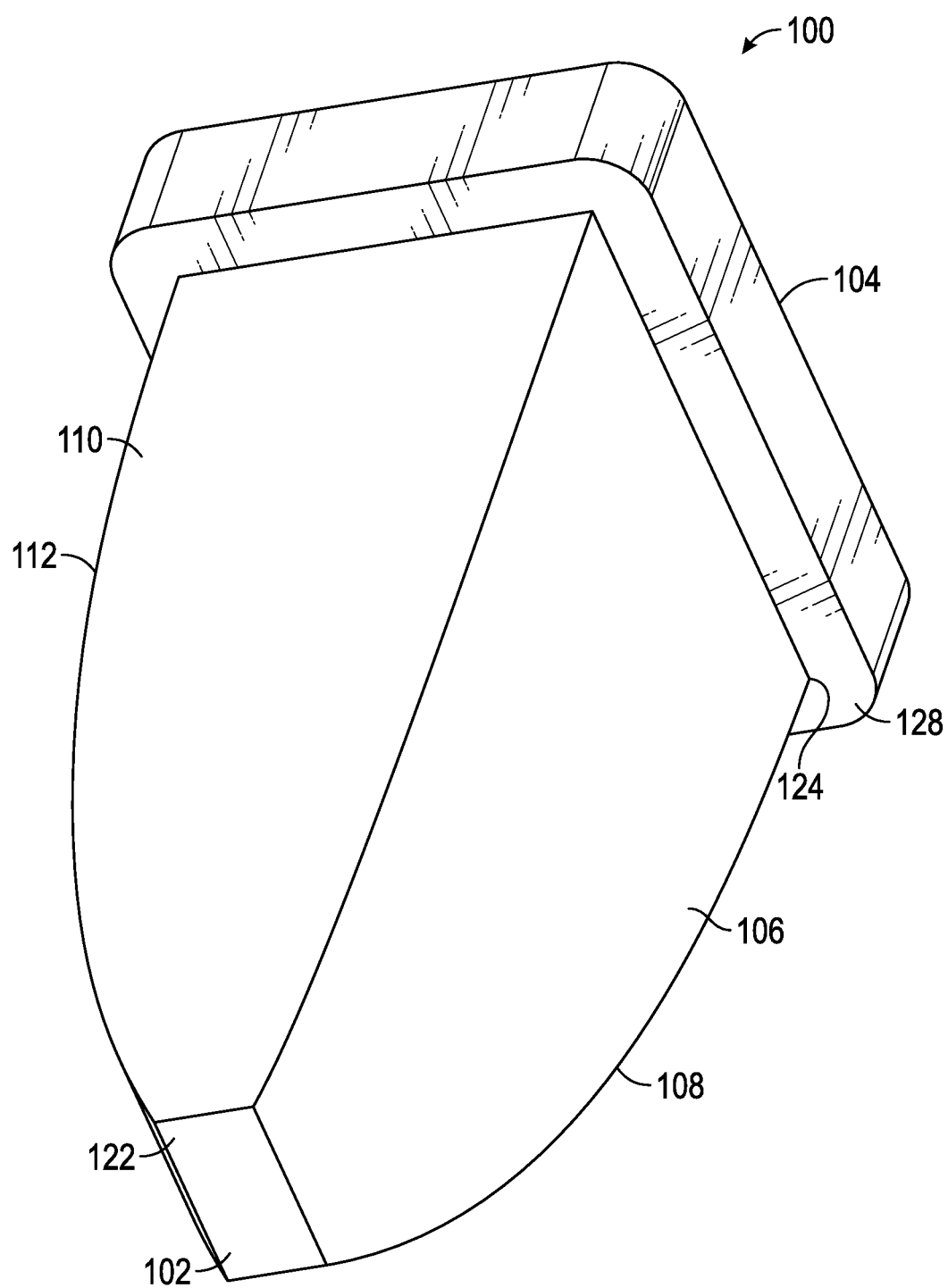
FIG. 2 is a bottom isometric view of a multi-angle lens module according to the present disclosure.

FIG. 2 is a bottom isometric view of a multi-angle lens module according to the present disclosure. The light receiving area 102 can be a substantially flat surface and can be configured to couple adjacent to a light source (shown in FIG. 5) to receive light into the lens module 100. While the light receiving area 102 is detailed as a rectangular surface, the light receiving area 102 can be any polygon shape including, but not limited to, square, circular, elliptical, and/or oval.

The light receiving area 102 can be a substantially transparent, or clear, surface to permit light traveling from a light source (shown in FIG. 5) to enter the lens module 100. In at least one example, the light receiving area 102 can be formed from optical glass to permit light receipt from the light source to the lens module 100. In other examples, the light receiving area 102 can be an aperture or void formed within a bottom surface 122 of the lens module to permit light receipt into the lens module 100.

As can further be appreciated in FIGS. 1 and 2, the lens module 100 can include a diffuser 126 coupled with an upper portion 124 of the lens module 100. The diffuser 126 can substantially cover the light emitting area 104. In at least one example, the diffuser 126 can extend beyond the light emitting area 104 and provide a lip 128 to couple the lens module 100 with a support structure, or tray, (shown in FIG. 7).

The diffuser 126 can have one or more diffuser lenses 130 coupled therewith. The one or more diffuser lenses 130 can maximize light distribution of the lens module 100 and improve light mixing in cooperation with the first reflection angle and the second reflection angle.

Figure 3:
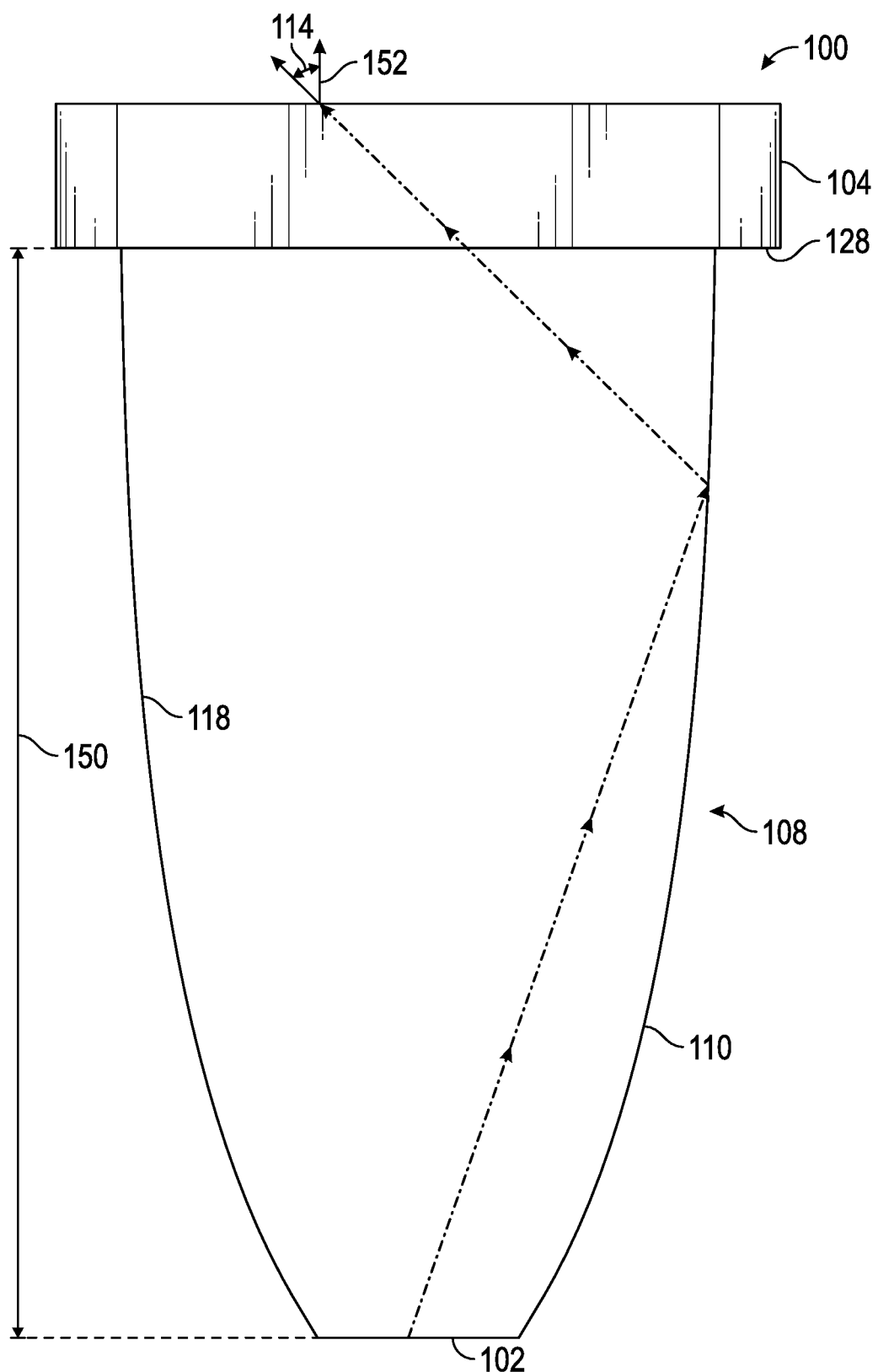
FIG. 3 is an elevational view of a first set of sidewalls of multi-angle lens module according to the present disclosure.

FIG. 3 is a profile view of a first set of sidewalls of a multi-angle lens module according to the present disclosure. The first set of sidewalls 106 can form the contour portion 108. The contour portion 108 can be defined by a single extensive equation. The single extensive equation can individually define the contour portion 108 of each sidewall of the first set of sidewalls 106. In at least one example, the contour portion can be described by a parabolic function. In one example, the first set of sidewalls can be defined by the parabolic curvature formed by the equation:

$$\rho(\theta) = \frac{2.2405}{0.2435 \cos\theta - 0.9699 \sin\theta + 1}$$

The contour portion 108 can generate a first reflection angle 114 relative to a normal vector 152 extending from the light emitting area 104. The normal vector 152 extends perpendicularly from the light emitting area 104. The contour portion 108 can be configured to reflect light emanating from a light source, through the light emitting area 104 at the first reflection angle 114.

The first reflection angle 114 can be between approximately 15° and 85° relative the normal vector 152. The first reflection angle 114 is determined by the contour portion 108 of the first set of sidewalls 106 and can be varied by altering the contour portion 108. In some examples, the first reflection angle is altered by changing the single extensive equation and/or parabolic function of the first set of sidewalls 106.

Figure 4:
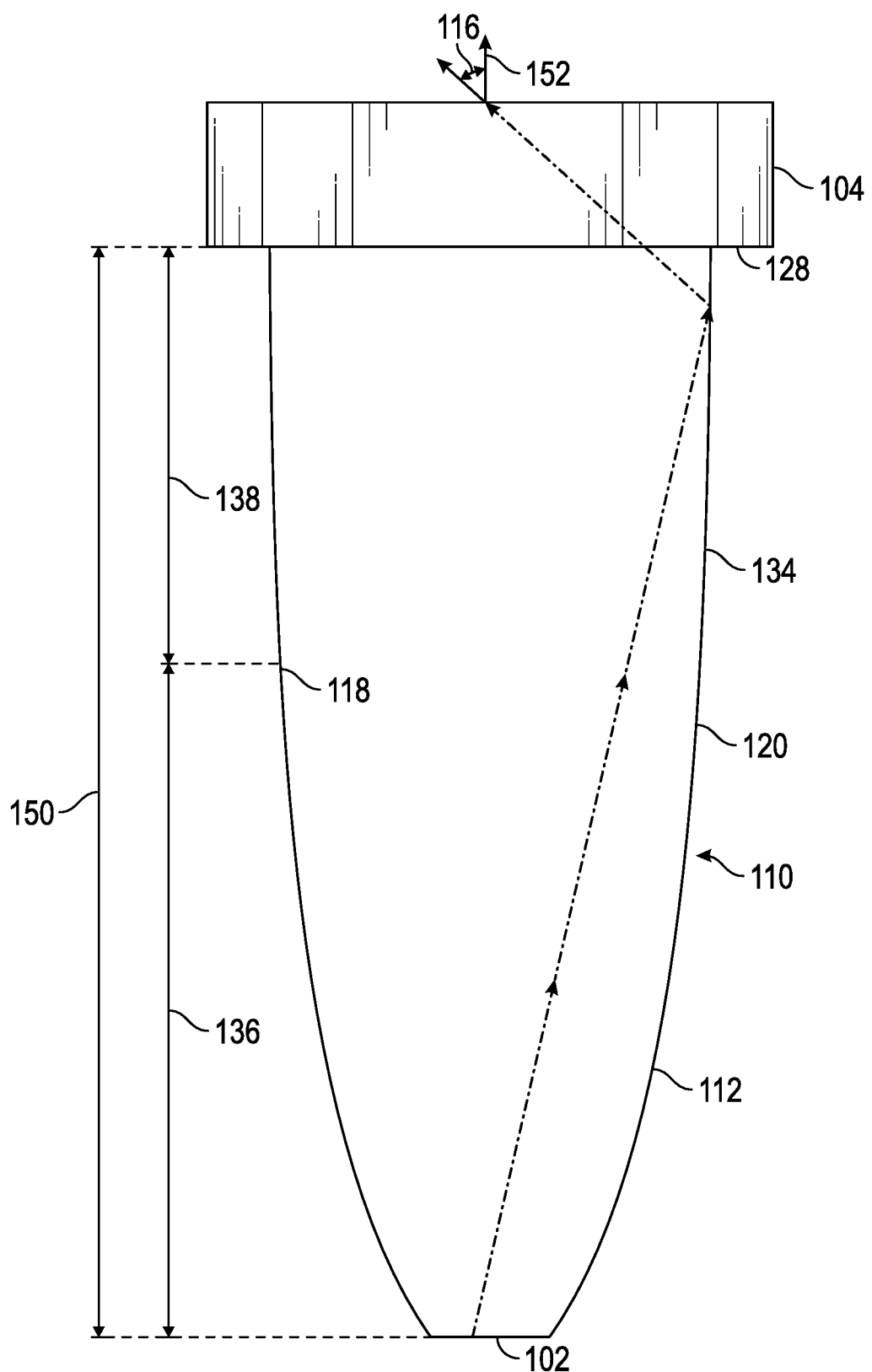
FIG. 4 is an elevational view of a second set of sidewalls of multi-angle lens module according to the present disclosure.

FIG. 4 is a profile view of a second set of sidewalls of a multi-angle lens module according to the present disclosure. The second set of sidewalls 110 can form the contour portion 112. The contour portion 112 can be defined by a single extensive equation. The single extensive equation can individually define the contour portion 112 of each sidewall of the second set of sidewalls 110. In at least one example, the contour portion can be described by a parabolic function. In one example, the second set of sidewalls can be defined by the parabolic curvature formed by the equation:

$$\rho(\theta) = \frac{4.5638}{0.3421 \cos\theta - 0.9397 \sin\theta + 1}$$

The contour portion 112 can generate a second reflection angle 116 relative to the normal vector 152 extending from the light emitting area 104. The contour portion 112 can be configured to reflect light emanating from a light source and through the light emitting area 104 at the second reflection angle 116.

The second reflection angle 116 can be between approximately 15° and 85° relative the normal vector 152. The second reflection angle 116 is determined by the contour portion 112 of the second set of sidewalls 110 and can be varied by altering the contour portion 108. In some examples, the first reflection angle is altered by changing the single extensive equation and/or parabolic function of the second set of sidewalls 110.

In at least one example, the contour portion 112 of the second set of sidewalls 110 can have two distinct contour portions. A first 132 of two distinct contour portions can extend a fraction 136 of the predetermined distance 150 from the light receiving area 102. A second 134 of the two distinct contour portions can extend a remaining fraction 138 of the predetermined distance 150. The first distinct contour portion 132 and the second distinct contour portion 134 can collectively make up the whole of the predetermined distance 150. The fraction 136 can be substantially one-half and the remaining fraction 138 can be substantially one-half. In other examples, the fraction 136 can also be any number between three-tenths (30%) and seven-tenths (70%).

Figure 5:
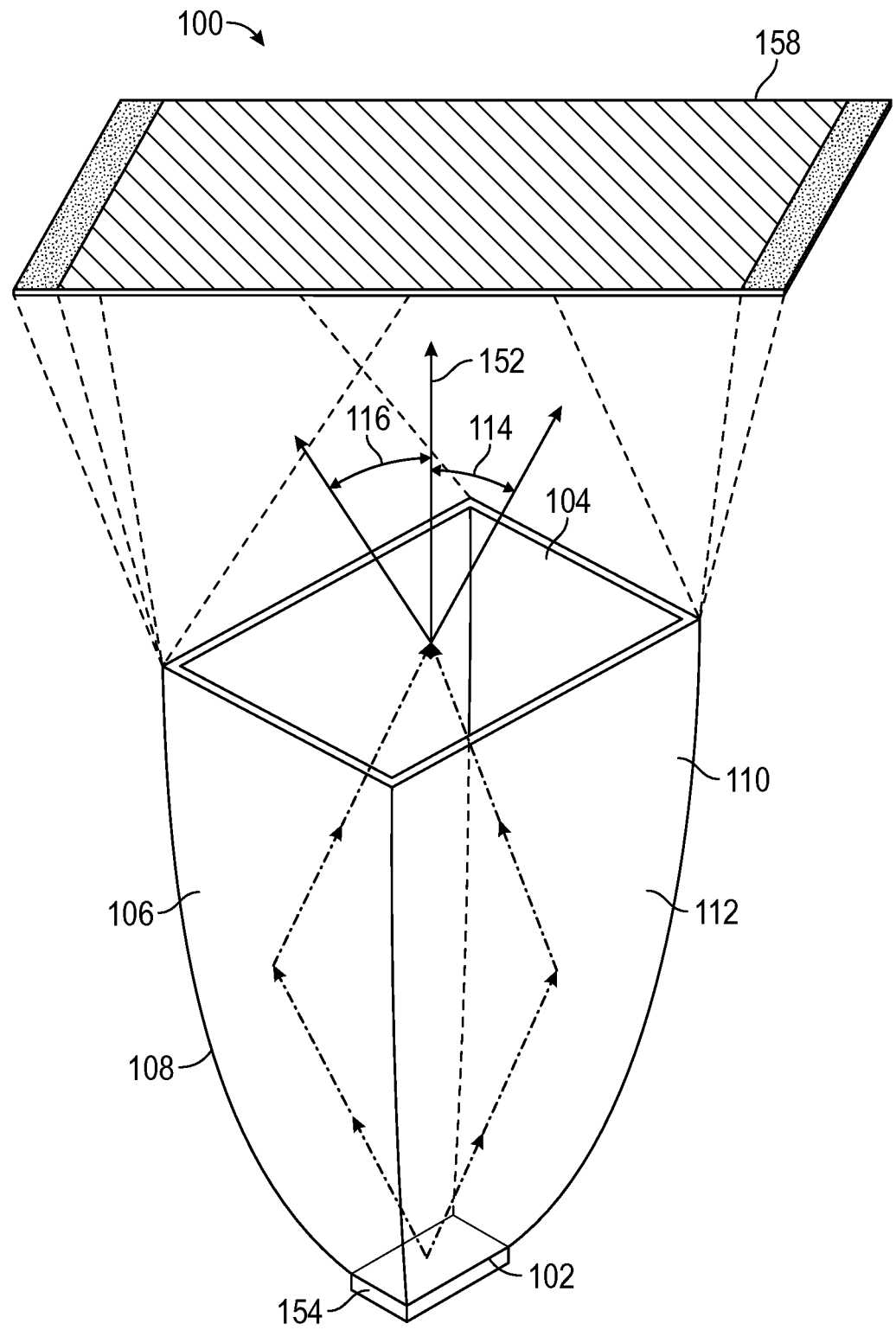
FIG. 5 is a diagrammatic view of a multi-angle lens module according to the present disclosure.

FIG. 5 is a diagrammatic view of a multi-angle lens module according to the present disclosure. The multi-angle lens module 100 can generate a first reflection angle 114 and a second reflection angle 116 with the first reflection angle 114 being different from the second reflection angle 116. The first reflection angle 114 and the second reflection angle 116 can provide light mixing of light received from a light source 154 while determining the light distribution 158 of the lens module 100.

The light source 154 can be adjacent to the light receiving area 102 and provide light into the lens module 100 through the light receiving area 102. The light can pass through the lens module 100 and be reflected by the first set of sidewalls 106 and/or the second set of sidewalls 110 exit the light emitting area 104 at the first reflection angle 114 or the second reflection angle 116.

The light source 154 can be an LED array. The LED array can be one or more LEDs arranged together. Each of the one or more LEDs can emit light at a predetermined wavelength and the predetermined wavelength can be different for each of the one or more LEDs. The LED array can be can further include a silica gel 160 disposed between the lens module 100 and the light source 154. In at least one example, the LED array can be a four by four diode LED array. In another example, the LED array can be a two diode LED array.

The lens module 100 can provide an optimized light distribution 158 of the light source 154 by generating the first reflection angle 114 and the second reflection angle 116. The diffuser 126 can further assist in achieving the desired light distribution 158. In at least one example, the light source 154 can have two or more individual light sources, each producing light at a different wavelength. The lens module 100 can be implemented to maximize light mixing to ensure the light distribution 158 is a substantially homogenous mixture of each of the two or more individual light sources.

Figure 6:
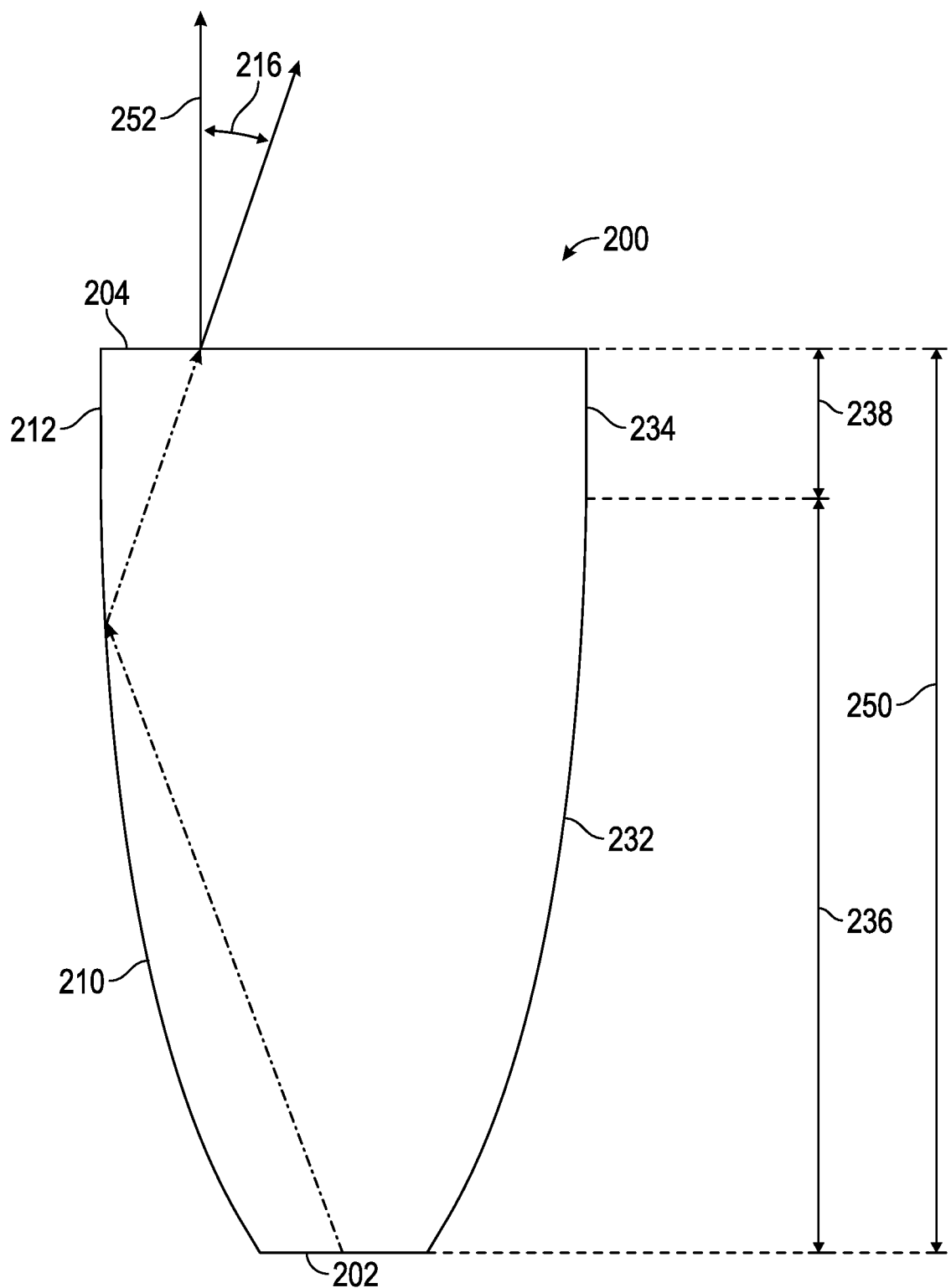
FIG. 6 is an elevational view of a second set of sidewalls of a multi-angle lens module according to a second example of the present disclosure.

FIG. 6 is a second example of a multi-angle lens module according to the present disclosure. A multi-angle lens module 200 can have a first set of sidewalls 206 having a contour portion 208 and a second set of sidewalls 210 having a contour portion 212. The contour portion 208 of the first set of sidewalls 206 can be formed by a single extensive parabolic equation and extend between a light receiving area 202 and a light emitting area 204. The light receiving area 202 and the light emitting area 204 can be separated by a predetermined distance 250. The first set of sidewalls 206 can generate a first reflection angle 214 relative to a normal vector 252 extending from the light emitting area 204.

The contour portion 212 of the second set of sidewalls 210 can have two distinct contour portions. The first of the two distinct contour portions can extend a fraction 260 of the predetermined distance 250 and follow a single extensive parabolic equation. The first of the two distinct contour portions can be the same as the contour portion 208 of the first set of sidewalls 206.

The second of the two distinct contour portions can extend the remaining fraction 262 of the predetermined distance 250. The fraction 260 and the remaining fraction 262 can make up the whole of the predetermined distance 250. In at least one example, the fraction 260 is substantially one-half and the remaining fraction 262 is substantially one-half.

The second of the two distinct contour portions can be substantially vertical and parallel to the normal vector 252. The second of the two distinct contour portions can allow the second set of sidewalls 210 to generate a second reflection 216 angle relative to the normal vector 252, even when the first of the two distinct contour portions mirrors the contour portion 208 of the first set of sidewalls 206. The first reflection angle 214 and the second reflection angle 216 are different, but can individually be any angle between about 15° and 85°.

Figure 7:
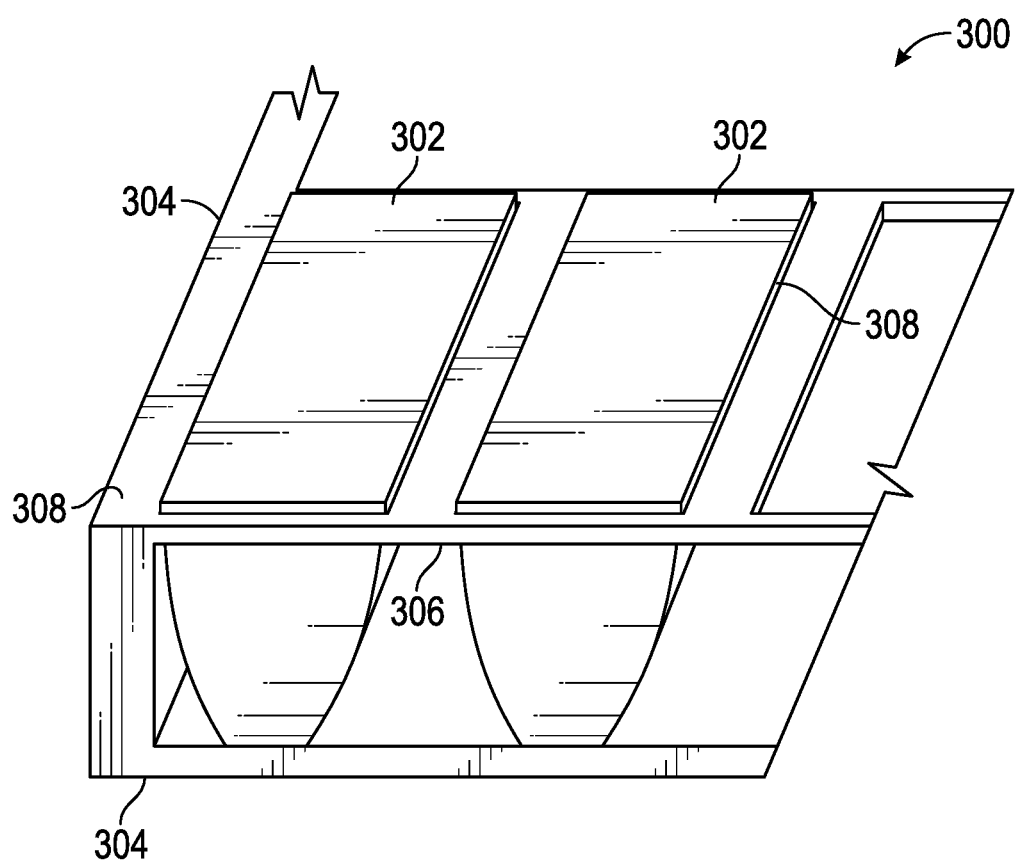
FIG. 7 is an isometric view of a plurality of multi-angle lens modules within a system according to the present disclosure.

FIG. 7 is an isometric view of a plurality of multi-angle lens modules coupled with a system according to the present disclosure. The system 300 can include a plurality of multi-angle lens modules 302 coupled to a tray 304. The tray 304 can have a perimeter element 306 configured to engage the lip 308 of the lens module 302. A clamping element (not shown) can be arranged to generate a pressure fit between the lip 308 and the perimeter element 306. In at least one example, each of the lens modules 302 can have an individual clamping element. In other examples, the tray 304 can have a single clamping element engaging the plurality of lens modules 302.

Figure 8:
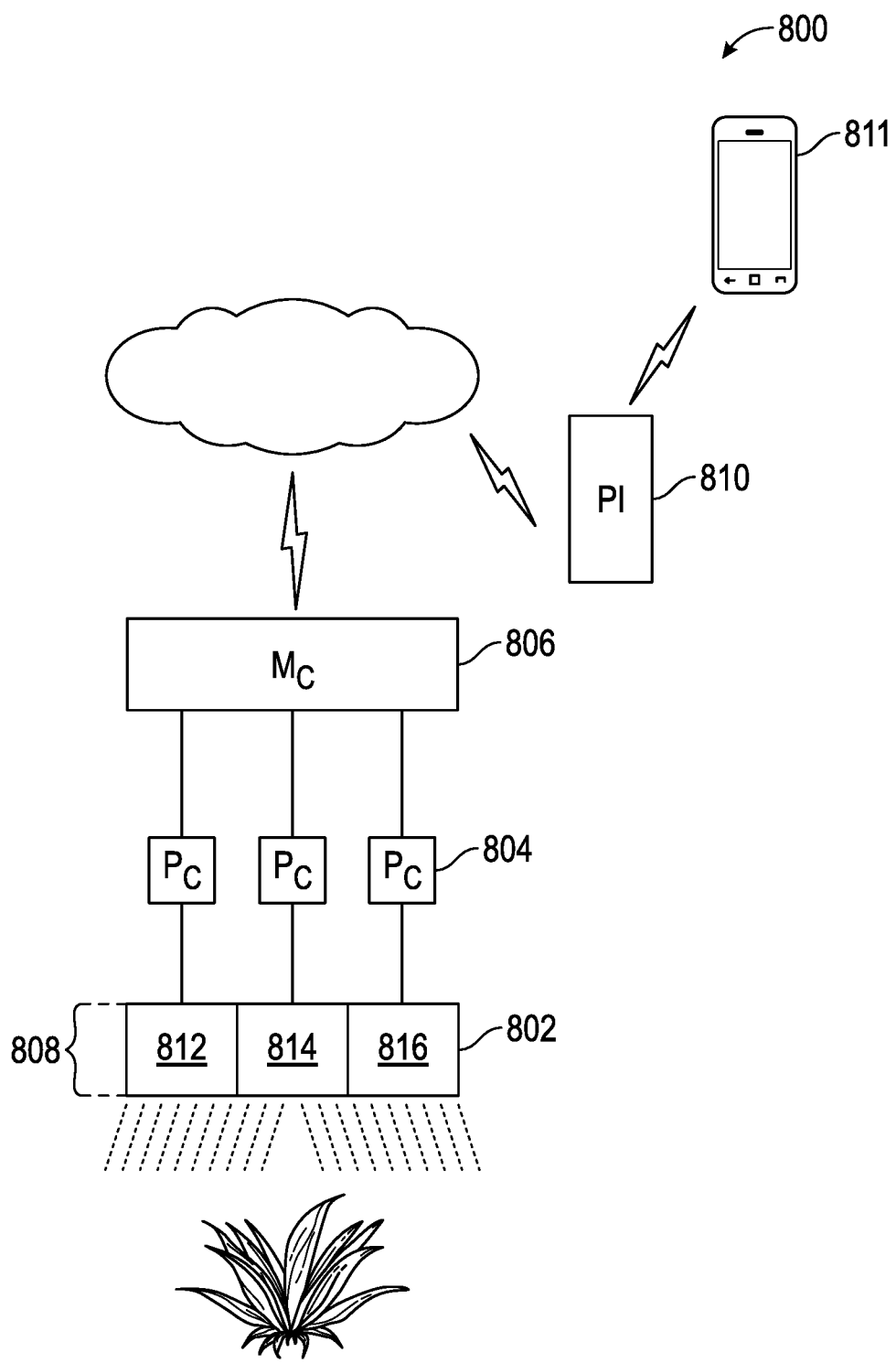
FIG. 8 is a diagrammatic view of a light system according to the present disclosure.

FIG. 8 is a lighting system according to the present disclosure. The lighting system 800 can have a plurality of light sources 802, a plurality of power output controllers 804, and master controller 806. In at least one example, the plurality of light sources 802 can be a plurality of light emitting diodes, each coupled with a lens module as described in FIGS. 1-7.

Each of the plurality of light sources 802 can be configured to output light at a predetermined wavelength and can be arranged in a corresponding group 808 according to the predetermined wavelength. In at least one example, the plurality of light sources 802 can be arranged in three groups, one group having a predetermined wavelength of about 475 nanometers, a second group having a predetermined wavelength of about 510 nanometers, and a third group having a predetermined wavelength of about 650 nanometers. Each of the power output controllers 804 can correspond to a different color band. The color band can be a cluster of frequency bands in the light spectrum associated with a certain color, for example blue light at 450 nanometers, green light at 525 nanometers, and red light at 650 nanometers.

The plurality of power output controllers 804 can be coupled with the corresponding groups of the plurality of light sources 802. The lighting system 800 can have a power output controller 804 for each of the corresponding groups 808. The plurality of power output controllers 804 can be configured to output a predetermined power level to the corresponding groups 808 of light sources 802.

A master controller 806 can be coupled with the plurality of power output controllers 804 and configured to provide a signal to the plurality of power output controllers 804. The master controller 806 can adjust the desired duty cycle, cycle period, and/or phase shift for each of the plurality power output controllers 804. In at least one example, the plurality of power output controllers 804 and the master controller 806 can generate a pulse-width modulation to control the plurality of light sources 802.

The lighting system 800 can further include a plant input unit 810. The plant input unit 810 can be communicatively coupled with the plurality of power output controllers 804 and/or the master controller 806. The plant input unit 810 can be configured to adjust the desired duty cycle, cycle period, and/or phase shift for each of the corresponding groups 808. The plant input unit 810 can be wired or wirelessly coupled to the lighting system 800. In at least one example, plant input unit 810 can be a cloud based device storing data relating to a plurality of plant species and the associated plant species' optimal duty cycle, cycle period, and/or phase shift for each corresponding group. In another example, the plant input unit 810 can be a server having one or more data storage devices and communicatively coupled to a network including one or more lighting systems 800.

The plant input unit 810 can receive an input from a user indicating a particular plant species and/or variety. The plant input unit 810 can then communicate with the plurality of power output controllers 804 and/or the master controller 806 to adjust the duty cycle, cycle period, and/or phase shift of the corresponding groups 808 of light sources 802 to optimize plant growth. In at least one example, the plant input unit 810 can be communicatively coupled with a mobile electronic device 811 and coupled with a cloud based device, wherein the user inputs a plant species into the mobile electronic device and the plant input unit 810 communicates with the plurality of output controllers 804 and/or the master controller 806. In another example, the plant input unit 810 can have a camera coupled with a cloud based device. The camera can detect leaf shape or other qualities about the plant to determine the plant species and optimal peak amplitude for the corresponding groups 808.

Figure 9:
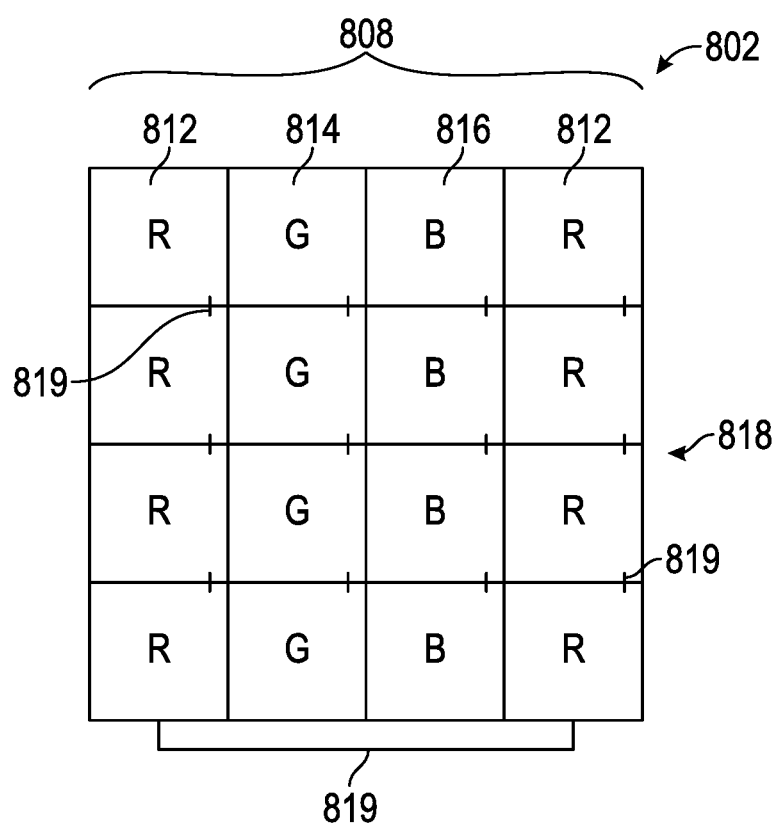
FIG. 9 is a diagrammatic view of a plurality of LEDs arranged in corresponding groups according to the present disclosure.

FIG. 9 is a plurality of light sources arranged in corresponding groups according to the present disclosure. The plurality of light sources 802 can be arranged in corresponding groups 808 according to the predetermined wavelengths. The plurality of light sources 802 can be arranged in three corresponding groups 812, 814, 816 with each of the three corresponding groups 812, 814, 816 having a different predetermined wavelength. In at least one example, the three corresponding groups 812, 814, 816 can be arranged in an array of columns. The first group 812 of the corresponding groups 808 can be a plurality of light sources producing a predetermined wavelength of about 650 nanometers, or light within the red visible spectrum. The second group 814 of the corresponding groups 808 can be a plurality of light sources producing a predetermined wavelength of about 510 nanometers, or light within the green visible spectrum. The third group 816 of the corresponding groups 808 can be a plurality of light sources producing a predetermined wavelength of about 475 nanometers, or light within the blue visible spectrum. In another example, the corresponding groups 808 can include a fourth group of light sources producing a predetermined wavelength between 700 nanometers and 1,000,000 nanometers, or light within the infrared spectrum.

The corresponding groups 808 can collectively form a light array 818. The corresponding groups 808 within the light array 818 can be arranged in any number of ways, patterns, or randomly. The corresponding groups 808 can be arranged by column, rows, diagonally, random order, or any other ordering method/algorithm. In at least one example, the light array 818 has three corresponding groups 812, 814, 816, with each group arranged in a column and corresponding group 812 having two columns. Corresponding group 812 is provided with twice the number of light sources 802 as corresponding groups 814 and 816. In other examples, the second column of corresponding group 812 can be a plurality of different light sources 802, such as infrared.

The light sources 802 within each corresponding group 808 can be electronically coupled with other light sources 802 within a particular group by an electrical coupling 819. The electrical coupling 819 can be a jumper wire coupling each light source 802 within a corresponding group in series. Alternatively, electrical coupling 819 can be a jumper wire coupling each light source 802 within a corresponding group 808 in series or parallel.

While FIG. 9 details a light array 818 having four columns by four rows arranged in three corresponding groups, the light array 818 can include any number of corresponding groups, plurality of light sources, and/or arrangement.

In at least one example, a lens module 100 as described in FIGS. 1-7 can be coupled with a single LED, multiple LEDs, a single corresponding group of LEDs, or any combination thereof. For example, the lens module can be coupled with one LED from a first corresponding group and one LED from a second corresponding group.

Figure 10A:
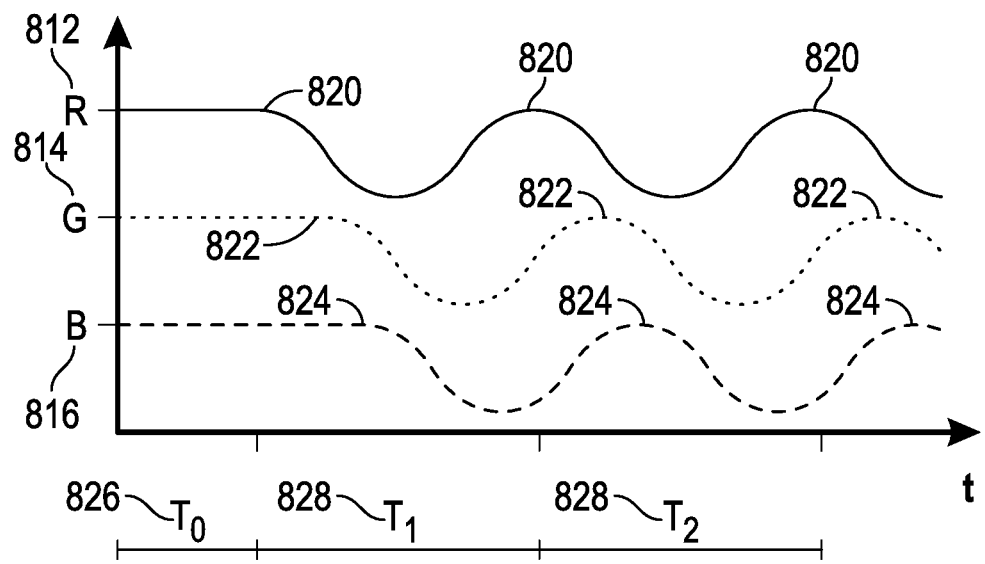
FIG. 10A is a graphical representation of a master controller shifting phase of the plurality of LEDs according to the present disclosure.

FIG. 10A is a graphical representation of a master controller shifting phase. The master controller 806 can be coupled with the plurality of power output controllers 804 and coupled with three corresponding groups 812, 814, 816 with each of the corresponding groups having a predetermined wavelength. Each of the three corresponding groups 812, 814, 816 can have an individual power output controller 804. The master controller 806 can provide a signal to the respective power output controller 804 adjusting the phase, thus shifting the peak amplitude.

The master controller 806 can provide a signal to each of the corresponding groups 812, 814, 816 to provide peak power for a first predetermined period of time 826. After the first predetermined period of time 826, the master controller 806 can provide a signal to the plurality of power output controllers 804 to oscillate the signal. During a second predetermined period of time 828, the oscillating signal can be a sinusoidal oscillation generated by the plurality of power output controllers 804. The master controller 806 can signal the plurality of power output controllers 804 to adjust the peak amplitude so that peak emissions are shifted 120 degrees in phase relative to the adjacent peak. A peak amplitude 820 of the first group 812 can be at the first predetermined period of time 826 and start the oscillation immediately thereafter. The second group 814 can maintain a peak amplitude 822 until beginning oscillation in response to a signal from the master controller 806 shifting the peak amplitude 822 of the second group 814 approximately 120 degrees in phase relative to the peak amplitude 820 of the first group 816. A peak amplitude 824 of the third group 816 can be shifted approximately 120 degrees in phase relative to the peak amplitude 822 of the second group and approximately 240 degrees in phase relative to the peak amplitude 820 of the first group.

While the illustrated example details a phase shift of 120 degrees for each of the first group 812, the second group 814, and the third group 816, it is within the scope of this disclosure to have any phase shift between 0 and 360 degrees, generated by the master controller 806.

The master controller 806 can provide signals to the plurality of power output controllers 804 to generate oscillation of each of the corresponding groups 808. The phase shift for each of the corresponding groups 808 can reduce overall power consumption by reducing power draw at any particular point in time. Peak power draw can occur when each of the three corresponding groups is at peak amplitude, for example the first predetermined period of time 826. Power draw can be reduced during the second predetermined period of time 828 by shifting the peak amplitude of each corresponding group 808 relative to another.

The second predetermined time period 828 can represent a cycle period. The cycle period can be the amount of time between two peak amplitudes of a particular group and the cycle period can be shortened or lengthened by the master controller 806 for each of the corresponding groups 808 individually. In at least one example, the cycle period can be 1000 μs (microseconds). For example, during germination and initial growth the cycle period can be shorter, while during fruiting of a mature plant the cycle period can be lengthened.

In at least one example, the oscillation of each of the corresponding groups 808 can provide light from each of the corresponding groups 808 light source 802 without reducing light absorption at a particular point. Oscillation does not prevent a plant exposed to the lighting system from absorbing light for photosynthesis. The oscillation provides the plant with effective amounts of each of the corresponding groups 808, while maintaining efficient growth and reducing overall power consumption.

While the illustrated example details each of the three corresponding groups having peak amplitude during the first predetermined period of time 826, it is within the scope of this disclosure to have one, two or any number of the corresponding groups at peak amplitude during the first predetermined period of time 826. Further, while the oscillation and phase shift is described with respect to three corresponding groups, it is within the scope of this disclosure for the master controller and plurality of power output controllers to generate a phase shift and oscillation in one, two, three, or more groups of light sources 802. The phase shift can be determined by the number of groups to maximize energy reduction. For example, for two corresponding groups the phase shift between the two groups can be approximately 180 degrees, while for four corresponding groups the phase shift between the four groups can be approximately 90 degrees.

Figure 10B:
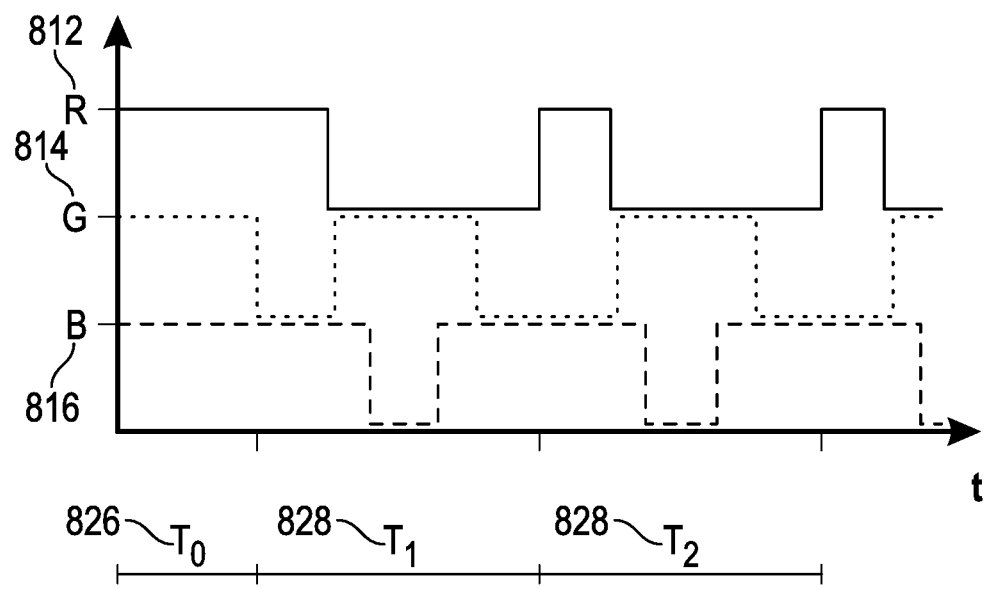
FIG. 10 B is a graphical representation of a master controller shifting duty cycle of the plurality of LEDs according to the present disclosure.

FIG. 10B is a graphical representation of a duty cycle. The master controller 806 can adjust the duty cycle of each of the corresponding groups 808 individually. The duty cycle 850 can be the intermittent operation of the corresponding groups 808, alternating between a light emitting condition and a non-light emitting condition. The duty cycle 850 can determine the portion of the second predetermined period of time 828 during which a corresponding group 808 is in a light emitting condition or a non-light emitting condition. The duty cycles 850 for each of the corresponding groups 808 can be individually controlled within a cycle period. In the light emitting condition, the corresponding group 808 can receive a constant current flow from the associated power output controller 804. In the non-light emitting controller, the corresponding group 808 can receive no current flow from the associated power output controller 804. The duty cycle 850 can be shifted by the same phase, as discussed with respect to FIG. 10A In at least one example, the duty cycle for the first group 812 can allow a light emitting condition for 25% of the cycle period, while the duty cycle for the second group 814 can generate a light emitting condition for 50% of the cycle period, and the duty cycle for the third group 816 can generate a light emitting condition for 75% of the cycle period.

In at least one example, the duty cycle for each of the corresponding groups 808 can begin after a first predetermined period of time 826 where each of the corresponding groups 808 receives a constant current flow from the plurality of power output controllers 804.

Adjusting the duty cycle for each of the first group 812, the second group 814, and the third group 816 can alter the density of light output by increasing and/or decreasing the amount of light at a wavelength from each of the corresponding groups 808. For example, increasing the duty cycle from 25% to 50% for the first group 812 can increase the amount of red light provided to the plant. The control of the different density of light output can be achieve by changing the driving currents. Additionally, the changes in phase shifting and cycle period can remain the same when the light output density is adjusted by the driving currents. In other examples, the phase shift and cycle period can be adjusted either independently or together.

The master controller 806 can adjust the cycle period, duty cycle, and/or phase shift for each of the corresponding groups individually. The plant input unit 810 can store data relating to the preferred or optimal cycle period, duty cycle, and/or phase shift for a plurality of plants and provide the appropriate data to the master controller 806. The master controller 806 can synchronize the plurality of power output controllers 804 to the appropriate cycle period, duty cycle, and phase shift for the appropriate plant.

While the illustrated embodiment details a common cycle period for each of the corresponding groups, it is within the scope of this disclosure to vary the cycle period for each of the corresponding groups individually.

Figure 11:
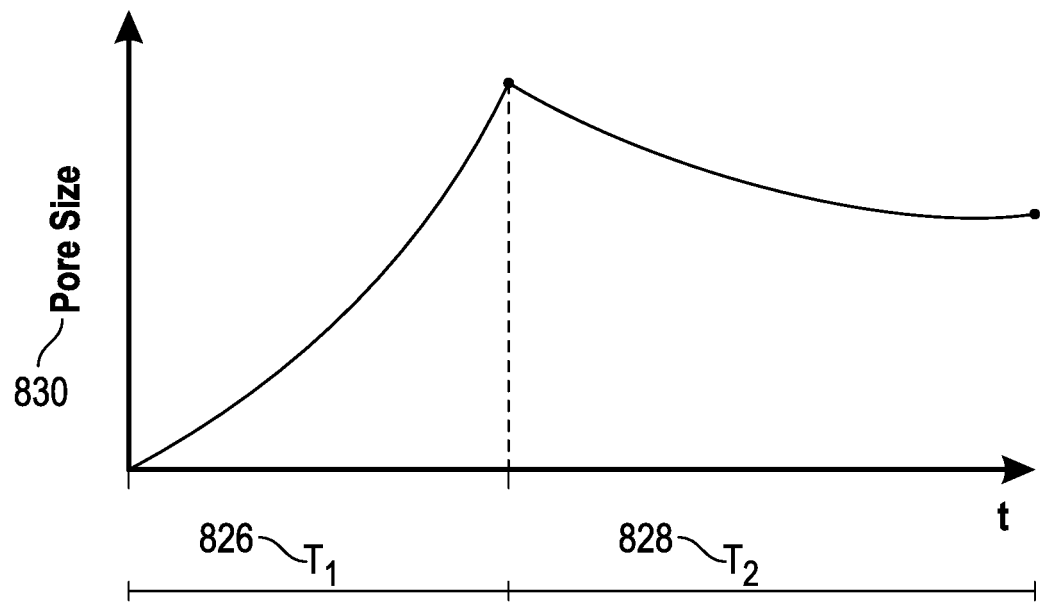
FIG. 11 is a graphical representation of pore size according to the present disclosure.
Figure 12:
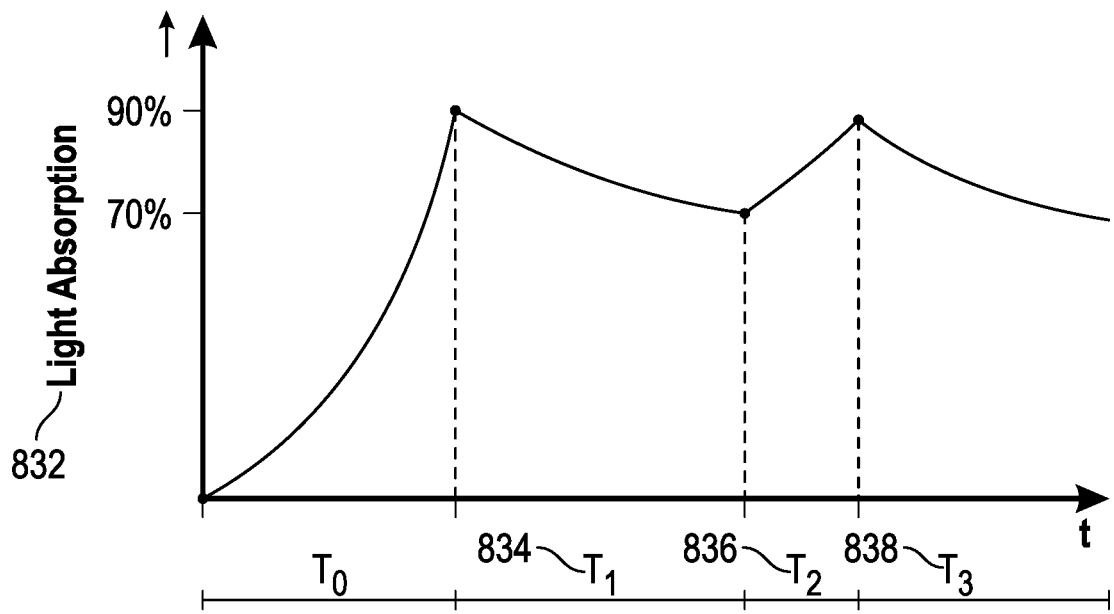
FIG. 12 is a graphical representation of absorption rate according to the present disclosure.

FIGS. 11 and 12 relate to the lighting system and related light control apparatus implemented with a plant growth operation. The plant growth operation can utilizing the lighting system 800 with, or without, a multi-angle lens module to maximize energy efficient plant growth. The lighting system 800 can be optimized for individual plant varieties through coupling with a plant input unit 810. While the FIGS. 11 and 12 relate to a plant growth operation, it is within the scope of this disclosure to implement the lighting system and related light control apparatus within other endeavors.

FIG. 11 is a graphical representation of pore size. The pore size 830 of a plant exposed to the lighting system 800 can vary with time. The pore size 830 during the first predetermined period of time 826 can increase due to exposure to the lighting system, thus increasing the light absorption rate (discussed below with respect to FIG. 12). After the first predetermined period of time 826 and during the second predetermined period of time 828, the pore size 830 can slowly decrease due to oscillation of the corresponding groups 808. The pore size 830 can remain suitable for efficient plant growth throughout the second period of time 828.

FIG. 12 is a graphical representation of light absorption rate. The lighting system 800 can utilize plurality of power output controllers 804 and the master controller 806 to manage and reduce overall power consumption by oscillating and shifting phase for each of the corresponding groups 808. The light absorption rate 832 (shown as a percentage) can decrease over a first period of time 834 during oscillation of the corresponding groups 808 of light sources 802. The light absorption rate 832 can be boosted by a second period of time 836 in which each of the corresponding groups 808 are operated at peak amplitude simultaneously without oscillation. The second period of time 836 operating at peak amplitude for each of the corresponding groups 808 can "wake up" a plant, thus boosting light absorption rate. The second period of time 836 can be followed by a third period of time during which oscillation and phase shift of the corresponding groups 808 occurs. The "wake up" period for the plant can be scheduled for a predetermined period of minutes, every few hours, every day, once a week, or otherwise as determined by the particular plant species and/or variety being utilized. In some examples, the plant input unit 810 can determine the desired "wake up" period.

The length of time of the first period of time 834, second period of time 836, and third period of time 838 can vary depending on the plant variety and/or species being utilizing in the growing operation. The first period of time 834, second period of time 836, and third period of time 838 can also vary in length individually. The first period of time 834 and the third period of time 838 can be substantially equal in length of time, while the second period of time 836 can be shorter. Alternatively, the first period of time 834 can be longer than the third period of time 838, but the second period of time 836 can be significantly shorter than either the first period of time 834 or the second period of time 838. The first period of time 834, second period of time 836, and third period of time 838 are determined by the plant input unit 810. In at least on example, the first period of time 834 and the third period of time 838 can be approximately 60-90 minutes in duration while the second period of time 836 can be approximately 10-15 minutes in duration.

FIG. 13 is an isometric view of a light stack assembly 1300. The light stack assembly 1300 can have an elongate body 1302. The elongate body 1302 can have a length 1350 extending from a proximal end 1304 to a distal end 1306. A plurality of LED arrays 1308 can be coupled with the elongate body 1302 and arranged along the length 150 thereof. The elongate body 1302 can be substantially hollow and allow the plurality of LED arrays 1308 to be coupled with and disposed within the elongate body 1302.

The elongate body 1302 can have any number of LED arrays 1308 disposed along the length 1350. The plurality of LED arrays 1308 can be evenly spaced along the length 1350 of the elongate body 1302. In at least one example, the elongate body 1302 has four LED arrays 1308 evenly spaced along the length 1350 between the proximal end 1304 and distal end 1306. In other examples, the plurality of LED arrays 1308 can be spaced closer together at the proximal end 1304 than at the distal end 1306 or spaced closer together at the distal end 1306 than at the proximal end 1304. In an example where only four LED arrays are implemented, the spacing between the middle two LED arrays can be greater than a distance between the first two LED arrays. In another example, the LED arrays can be clustered with a first group of LED arrays disposed proximate the proximal end and evenly spaced among the first group of LED arrays, a second group of LED arrays disposed substantially in the middle of the elongate body and evenly spaced among the second group of LED arrays, and a third group of LED arrays disposed proximate the distal end and evenly spaced among the third group of LED arrays. The spacing within the first group, the second group, and the third group can be substantially the same, with the spacing between groups being greater than the spacing within a group.

While FIG. 13 details an elongate body 1302 having four LED arrays 1308 coupled with therewith, it is within the scope of this disclosure to couple any number of LED arrays 1308 with the elongate body 1302. For example, the elongate body 1302 can have two, three, five, or more LED arrays 1308 coupled therewith. Further, while FIG. 13 details an elongate body 1302 having LED arrays 1308 on one surface of the elongate body 1302, it is within the scope of this disclosure to implement LED arrays 1308 on more than one surface of the elongate body 1302. For example, the elongate body 1302 can have a plurality of LED arrays 1308 disposed on the front side and a plurality of LED arrays 1308 disposed on the opposing rear side. In another example, one side of the elongate body 1302 is free from LED arrays to allow for a heat dissipation device.

The plurality of LED arrays 1308 can be coupled with a control module 1310 (shown more clearly in FIG. 15). The control module 1310 can be configured to individually transition each of the plurality of LED arrays 1308 between a light emitting condition and a non-light emitting condition.

Figure 16:
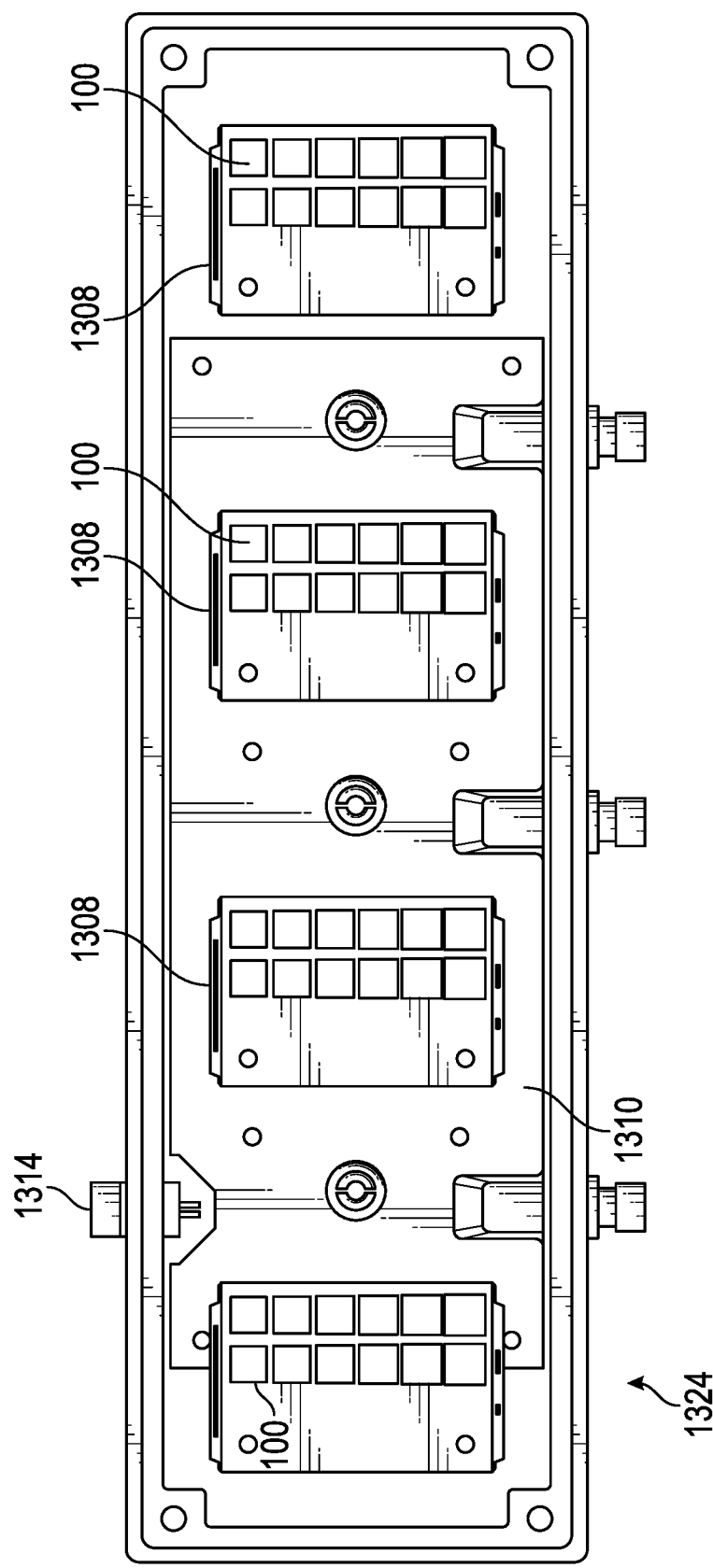
FIG. 16 is a top view of a rear portion of a light stack assembly according to the present disclosure.

The light stack assembly 1300 can have a plurality of proximity sensors 1312 coupled with the elongate body 1302 and the control module 1310 (shown in FIG. 16). The plurality of proximity sensors 1312 can be arranged along the length 1350 of the elongate body 1302 and configured to register an object within a predetermined distance. The plurality of proximity sensors 1312 can determine whether an object is within the predetermined distance and the control module 1310 can transition one or more of the plurality of LED arrays 1308 in response to the determination of the plurality of proximity sensors 1312. In at least one example, the control module 1310 can transition an adjacent LED array 1308 in response to an object as determined by the plurality of proximity sensors 1312. The predetermined distance can be based on the implemented sensors, adjusted by the control module 1310, or set in response to a user input.

The light stack assembly 1300 can be implemented within a controlled plant growth environment and the plurality of proximity sensors 1312 can be arranged to determine the overall plant growth. As the plant growth increases along the length 1350 of the elongate body 1302, subsequent proximity sensors of the plurality of proximity sensors 1312 can detect the plant growth (object) and transition the subsequent LED arrays 1308 from a non-light emitting condition to a light emitting condition, thus reducing energy consumption.

The elongate body 1302 can include one or more network connections 1314 to couple the light stack assembly 1300 with an intranet, the internet, or other network. The light stack assembly 1300 can also have a wireless communication module to allow wireless communication with an intranet, the internet, or other network. In at least one example, the one or more network connections 1314 can couple the light stack assembly 1300 with the plant input unit 810 and the cloud based storage. The one or more network connections 1314 can receive inputs relating to the predetermined distance detectable by the plurality of proximity sensors 1312.

The light stack assembly 1300 can include a mounting structure 1352 configured to couple the elongate body 1302 with an adjacent environment. The mounting structure 1352 can allow the light stack assembly 1300 to mount to a vertical surface, a horizontal surface, or any surface at any angle.

FIG. 14 is a rear isometric view of a light stack assembly according to the present disclosure. The elongate body 1302 can be formed, milled, molded, machined, or 3-D printed from polymers, metals, epoxy resins, wood, or any other material. The elongate body 1302 can have a heat dissipation portion 1316 formed into at least one side. The heat dissipation portion 1316 can be a passive cooling system configured to allow the light stack assembly 1300 to reject waste heat to an ambient environment. While the heat dissipation portion 1316 is shown on the rear surface of the elongate body 1302, it is within the scope of this disclosure to implement a heat dissipation portion 1316 on any surface of the elongate body 1302. Further, while a passive cooling system is shown and described, it is within the scope of this disclosure to implement a non-passive cooling system, for example forced air cooling or liquid cooling.

FIG. 15 is an exploded view of a light stack assembly and mounting structure according to the present disclosure. The light stack assembly 1300 can have a lens 1318 coupled to the elongate body 1032 and providing an emitting surface an LED array 1308. The light stack assembly 1300 can have a plurality of lenses 1318 corresponding to each of the plurality of LED arrays 1308. The plurality of lenses 1318 can be formed at an angle 1320 relative to the elongate body 1302. The angle 1320 can be between 15 degrees and 60 degrees relative to the elongate body 1302. In at least one example, the angle 1320 is about 30 degrees.

While FIG. 15 details an elongate body 1302 having the plurality of LED arrays 1308 arranged at an angle relative to the elongate body 1302, it is within the scope of this disclosure to arrange the LED arrays 1308 to emit light perpendicular to the length 1350 of the elongate body 1302. An optical device can be implemented to distribute the emitted light at any angle relative to the elongate body 1302. The lens 1318 can be maintained at an angle relative to the elongate body 1302 with the optical device disposed between the lens 1318 and the LED array 1308.

The elongate body 1302 can be a two-piece construction having a front portion 1322 and a rear portion 1324. The front portion 1322 and the rear portion 1324 can be coupled together via a snap connection, pressure fit, tongue-groove, or threaded fasteners. The two-piece construction of the elongate body 1302 can provide easy access to interior components disposed within, for example the plurality of LED arrays 1308. In at least one example, a gasket can be included to seal the components from wet/humid environment conditions. A valve can be configured to allow pressure equalization, but prevent entrance of moisture.

The light stack assembly 1300 can have a plurality of lens modules 100 disposed therein and coupled with the plurality of LED arrays 1308. In at least one example, each LED array 1308 can have a plurality of lens modules 100 coupled therewith. In another example, each LED array 1308 can have a single lens module 100 coupled therewith.

FIG. 16 is a partially assembled rear portion of a light stack assembly according the present disclosure. The rear portion 1324 can receive the control module 1310 and a plurality of LED arrays 1308 therein. The control module 1310 can be coupled with each of the plurality of LED arrays 1308 and configured to transition each between a light emitting condition and a non-light emitting condition.

The control module 1310 can be implemented with a master controller 806, described above with respect to FIGS. 9-12. The control module 1310 can be coupled with a master controller 806 or integrated therewith and coupled to a plant input unit 810 to receive instructions. The plant input unit 810 can control the oscillation of a LED array 1308, as described above, and send instructions to the control module 1310 to transition one or more LED arrays 1308 between the light emitting condition and the non-light emitting condition.

In at least one example, the control module 1310 can transition each of the plurality of LED arrays 1308 from the non-light emitting condition to the light emitting condition after a predetermined period of time. The control module 1310 can transition each of the plurality of LED arrays 1308 sequentially from one end of the elongate body 1302 to the opposing end of the elongate body. In another example, the control module 1310 can transition each of the plurality of LED arrays 1308 a predetermined period of time, with each LED array 1308 having a different predetermined period of time. In another example, the control module 1310 can transition each of the LED arrays 1308 according to the detection of an object by the plurality of proximity sensors 1312. In yet another example, the control module 1310 can transition the plurality LED array 1308 according to instructions received from the plant input unit 810. The plant input unit 810 can determined the appropriate predetermined period of time before transition each of the plurality of LED arrays 1308.

The control module 1310 can increase the energy efficiency and reduce overall consumption of the light stack assembly 1300 by transitioning the appropriate LED array 1308 during the appropriate stage of plant growth. For example, a LED array 1308 at the proximal end 1304 can be operate at the beginning stages of plant growth (germination). As plant height increases, subsequent LED arrays 1308 in the middle of the elongate body 1302 can be transitioned from the non-light emitting condition to the light emitting condition to ensure the plant has sufficient light exposure for optimal growth. The control module 1310 can continue transition subsequent LED arrays 1308 as plant growth occurs, ensuring only necessary and relevant LED arrays 1308 are transition, thus saving energy. In at least one example, the control module can transition the LED arrays 1308 from the light emitting condition to the non-light emitting condition after the plant has reached a certain height.

The light stack assembly 1300 can be implemented with a lens module 100 disposed on the LED array 1308 and the plurality of power output controllers 804 and the master controller 806 working in combination with the control module 1310 to reduce energy consumption of individual LED arrays 1308 and the light stack assembly 1300.

Figure 17:
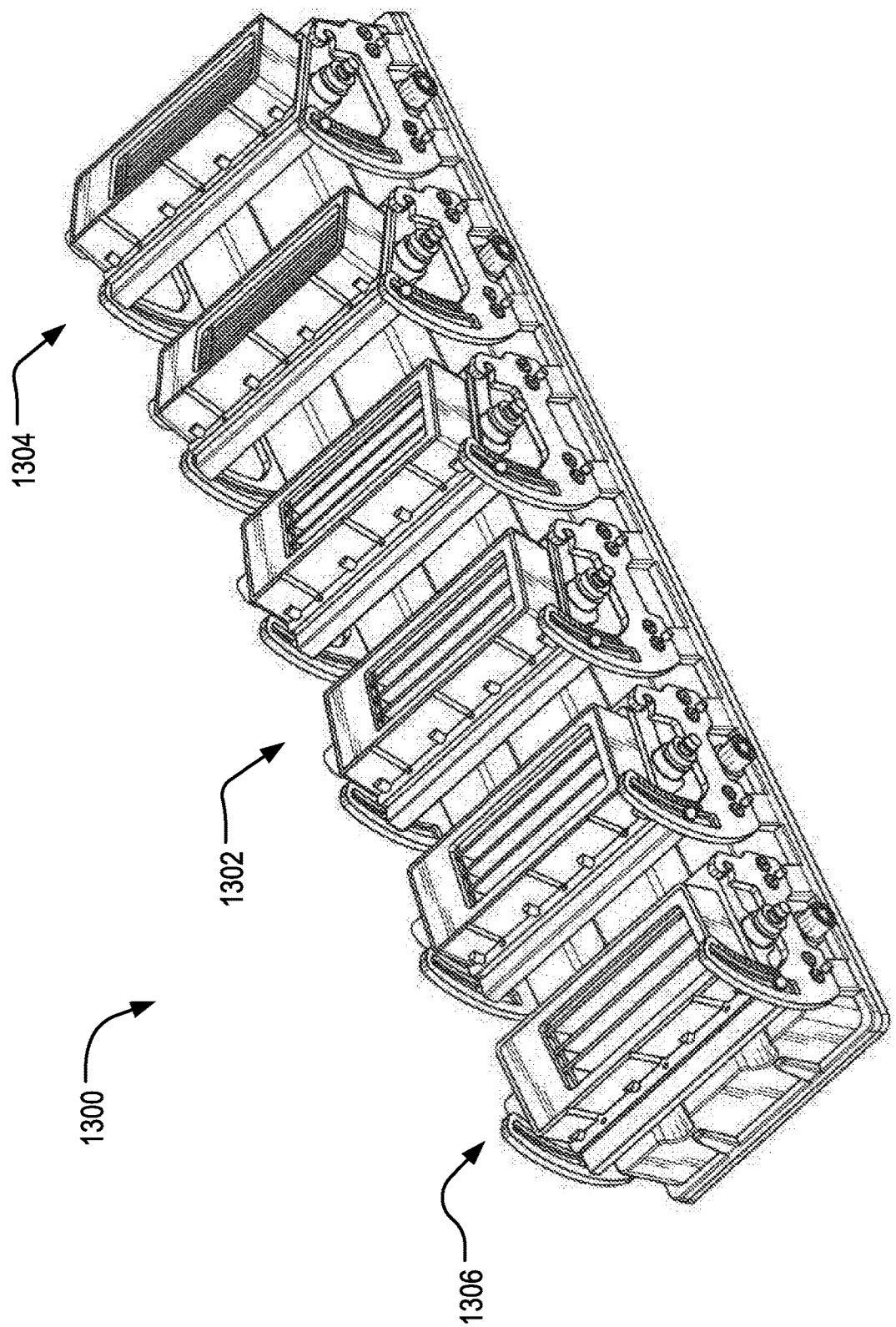
FIG. 17 is a top isometric view of a light stack assembly according to another example of the present disclosure.

FIG. 17 is a top isometric view of a light stack assembly 1300 according to another example of the present disclosure. The light stack assembly 1300 can include an elongate body 1302 having a length 1350 extending from a proximal end 1304 to a distal end 1306. The light stack assembly 1300 of FIGS. 17-23 can integrate one or more of the above described components.

Figure 18:
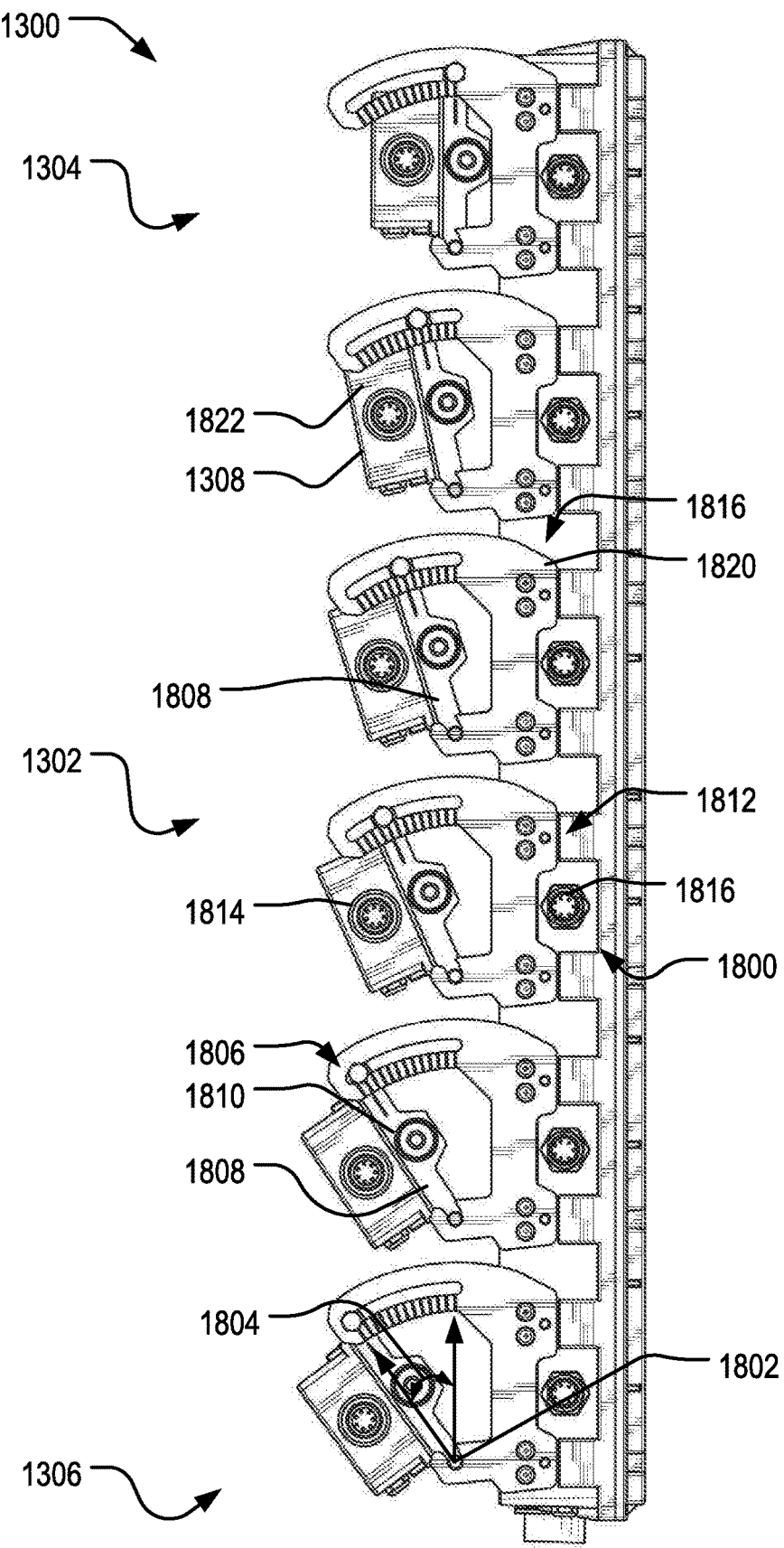
FIG. 18 is a horizontal side view of the light stack assembly according to another example of the present disclosure.

FIG. 18 is a horizontal side view of the light stack assembly 1300 according to another example of the present disclosure. A plurality of LED arrays 1308 can be coupled with the elongate body 1302 and arranged along the length 1350. The plurality of LED arrays 1308 can be coupled with a control module 1310. The control module 1310 can be configured to individually transition each of the plurality of LED arrays 1308 between a light emitting condition and a non-light emitting condition. The control module 1310 can include a plurality of controllers 1800, wherein each controller corresponds to each of the plurality of LED arrays 1308 and are also positioned along the length 1350 of the elongate body 1302. Each of the plurality of controllers 1800 can communicate and send commands to each corresponding LED array of the plurality of LED arrays 1308 via a pair of pin connectors 1812. A first pin connector 1814 can be positioned on an LED array 1308 and a second pin connector 1816 can be positioned on a controller 1800. In other examples, a corresponding controller 1800 and LED array 1308 can be coupled to exchange data via another type of wired connection. In still other examples the connection can be a wireless connection. In the illustrated example, the pair of pin connectors 1812 is configured for wet or even submerged environments and allows for secure transmission of data even in harsh environments.

The plurality of LED arrays 1308 can include a housing 1822 that is configured to be coupled to a cooling plate 1808. The cooling plate 1808 has a thickness through which one or more water passages are formed extending from a cooling port 2018 to an exit port 2020, shown in FIG. 20. In at least one example, the cooling port 2018 is located on a side of the cooling plate 1808 and the exit port 2020 can be located on a side opposite of the side on which the cooling port 2018 is mounted.

As illustrated, each of the plurality of LED arrays 1308 can further include a cooling assembly 1806 having the cooling plate 1808 and a pair of cooling ports 2016 having the cooling port 2018 and the exit port 2020. The cooling liquid can be any liquid, for example, water, or the like. The cooling assembly 1806 directly cools each of the plurality of LED arrays 1804, which prevent overheating of the system and reduces the amount of cooling for the entire area. Additionally, the cooling assembly 1806 prevents heat transfer to the control module 1310. The cooling liquid can be administered in several ways resulting in individual cooling or group cooling. In one example, cooling liquid can enter a first cooling port 2000 of a first cooling plate 2004 and exit a first exit port 2002 of the first cooling plate 2004, shown in FIG. 20. Cooling liquid can enter and exit each cooling plate 1808 in the same manner, such that each cooling plate is individually cooled. In another example, the cooling plates 1808 can be serially cooled. Cooling liquid can enter the first cooling port 2000 of a first cooling plate 2004, then exit the first exit port 2002 into a connector, not shown, which delivers the cooling liquid to a second cooling port 2006 of a second cooling plate 2010. Similarly, the cooling liquid can exit the second cooling plate 2010 by a second exit port 2008 into a connector, not shown, which delivers the cooling liquid to a third cooling port 2012 of a third cooling plate 2014. The cooling liquid then travels through each cooling plate until reaching the sixth cooling plate where the cooling liquid exits. The cooling plate 2010 can include a plurality of passages formed therethrough. In other examples, a single passage can be made. In at least one example, the single passage can take a circuitous route or it can be a direct passage. The cooling liquid can exit to a cooling liquid source where the now heated cooling liquid can be cooled to a useable temperature via a heat exchanger such as a shell and tube heat exchanger, plate heat exchangers, plate and shell heat exchangers, fluid heat exchanger, or the like.

Figure 19A:
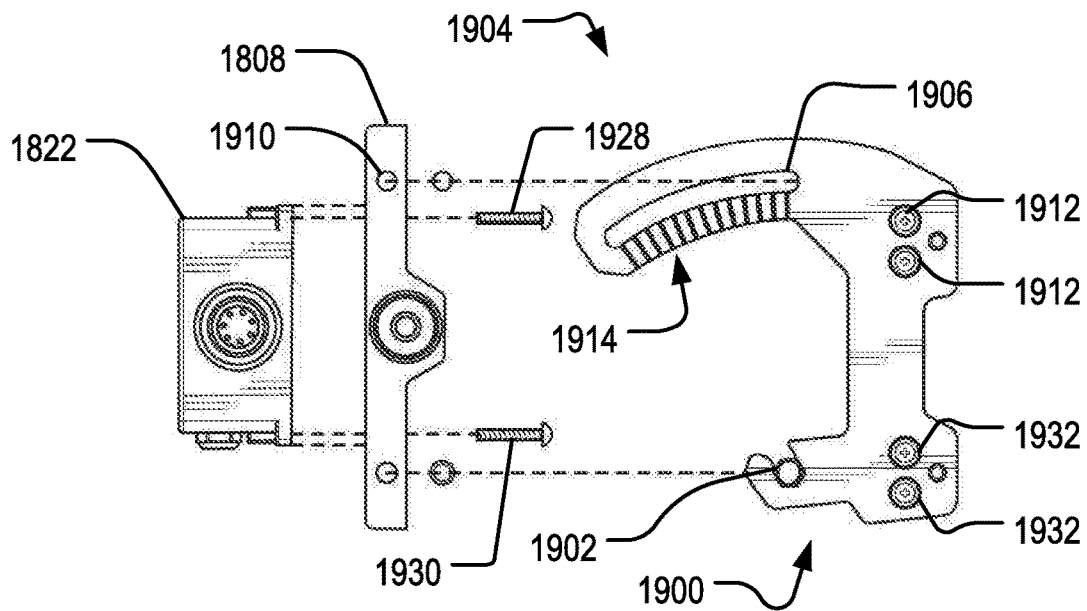
FIGS. 19A-B are a side and isometric exploded view, respectively, of an LED array, cooling assembly, and support structure.
Figure 19B:
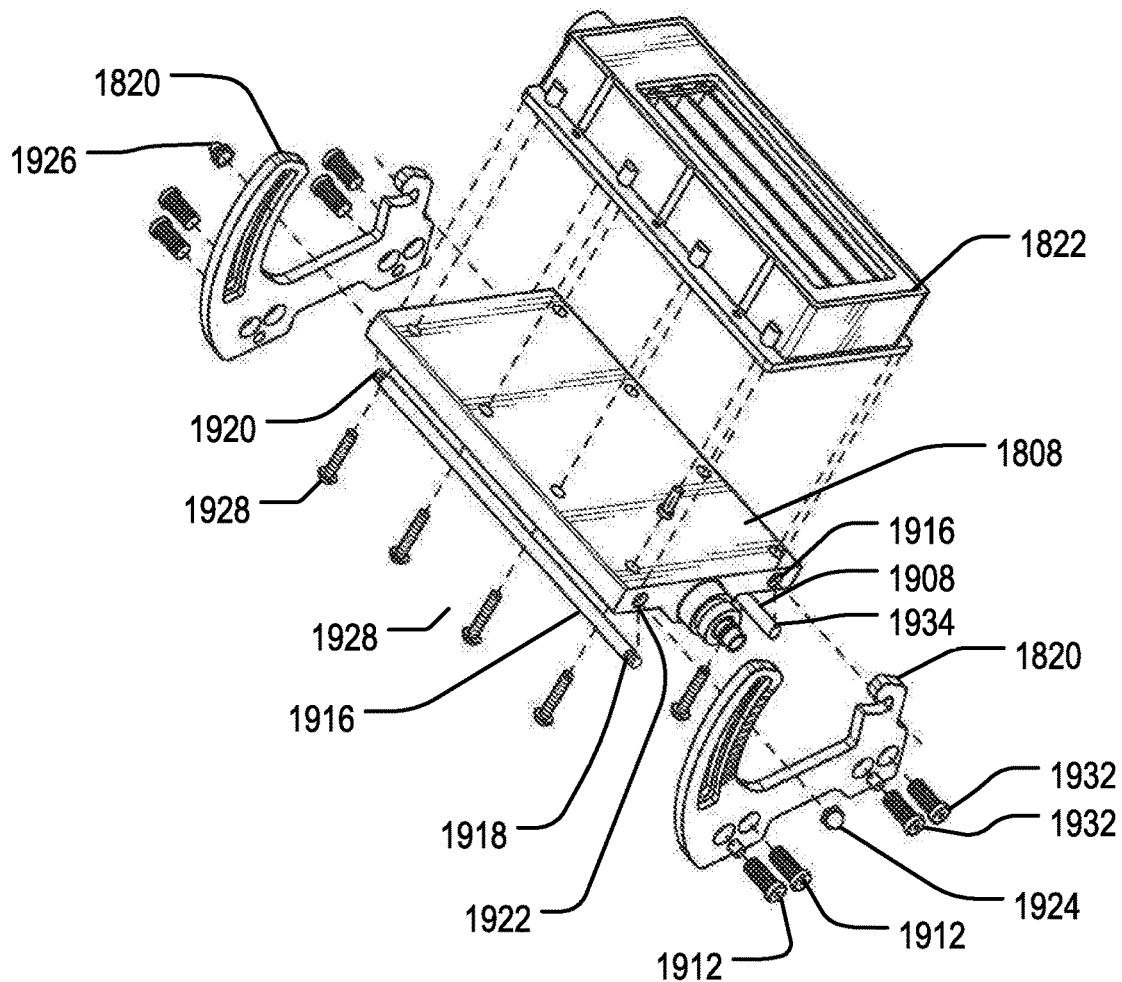

FIGS. 19A-B are a side and isometric exploded view, respectively, of one of the plurality of LED arrays 1308, the cooling assembly 1806, and a support structure 1816. Each of the plurality of LED arrays 1308 can be individually adjustable and can pivot on an axis 1802, thereby forming an angle 1804 relative to the elongate body 1302, shown in FIG. 18. Each of the plurality of LED arrays 1308 can be coupled to the elongate body 1302 via the support structure 1816 having a pair of frames 1820. A receiver 1902 protrudes from the bottom of each frame 1820 and includes an open slot 1902 configured to receive a rod 1908. Each frame 1820 also includes a curvilinear limb 1904, which protrudes further than the receiver 1900 and curves towards the receiver 1900 and a corresponding curvilinear closed slot 1906 near the top of the frame 1820. Each frame 1820 can be mounted to the elongate body 1302 in any way including, but not limited to, screws, rivets, adhesion, or welding. In one example, each frame 1820 is screwed onto the elongate body 1302 with two screws 1912 near the top of the frame 1820 and two screws 1932 near the bottom of the frame 1820. Each frame 1820 can also be integrated into the elongate body 1302 as one piece. Each frame 1820 can be made of any solid material including, but not limited to, metal, plastic, wood, or the like.

The cooling plate 1808 can be mounted to each of the pair of frames 1820 via pins, screws, or any other mechanism which allows the cooling plate 1808 to pivot about the receiver 1900. In one example, the cooling plate 1808 includes the rod 1908 and a first bore 1916 configured to receive the rod 1908. The rod 1908 extends past the first bore 1916 on both ends of the cooling plate 1808 such that the extended portions 1934 of the rod 1908 can be received by the corresponding open slot 1902 of each frame 1820. The cooling plate 1808 also includes a second rod 1916 having a first threaded end 1918 and a second threaded end 1920. A second bore 1922 is configured to receive the second rod 1916. The first threaded end 1918 and the second threaded end 1920 both extend past the second bore 1922 such that they are exposed and can be received by the curvilinear closed slot 1906 of each frame 1820. A first cap 1924 and a second cap 1926 can be screwed onto the first threaded end 1918 and the second threaded end 1920, respectively. When the first cap 1924 and the second cap 1926 are loose, the cooling plate 1808 can pivot due to the free rotation of the extended portions of the rod 1908 in the each open slot 1902, and can be positioned at the desired angle. When the cooling plate 1808 is at the desired angle, the pair of screws 1912 can be tightened until the cooling plate 1808 is locked in position.

In another example, not shown, the rod is integrated into the cooling plate 1808 such that the cooling plate has a pair of pins positioned on each end and near the bottom of the cooling plate 1808 and a pair of threaded holes on each end near the top of the cooling plate 1808. The pair of pins is received by the corresponding open slot 1902 of each frame 1820 while the pair of threaded holes is aligned with each of the corresponding closed slot 1906 of each frame 1820. A pair of screws can be screwed into each threaded hole to secure the cooling plate 1808 to the frame 1820. When the pair of screws is loose, the cooling plate 1808 can pivot due to the free rotation of the pair of pins in each open slot 1902, and the cooling plate 1808 can be positioned at the desired angle. When the cooling plate 1808 is at the desired angle, the pair of screws 1912 can be tightened until the cooling plate 1808 is locked in position.

Each of the plurality of LED arrays 1308 is coupled to a corresponding cooling plate 1808 via screws, rivets, adhesion, or the like. In one example, the cooling plate is screwed into the cooling plate 1808 via four screws 1930 on the bottom, shown in FIGS. 19A and 21, and four screws 1928 on the top, shown in FIGS. 19A-B and 17. The closed slot 1906 can have a plurality of notches 1914 painted or etched into the frame 1820 and the cooling plate 1808 can have a corresponding notch 1916, shown in FIG. 18, painted or etched into the cooling plate 1808 to aid in positioning of each of the plurality of LED arrays 1308. In another example, not shown, the controllers 1800 can automatically adjust the angle of each of the plurality of LED arrays 1308 according to the plant input unit 810 or a specific grow plan for a plant. Each of the plurality of LED arrays 1308 can be automatically adjusted by a rotary actuator such as, but not limited to, stepper motors, servomotors, or the like. The angle 1804 of each of the plurality of LED arrays can be between −90 degrees and 90 degrees. The angle 1804 of each of the plurality of LED arrays can be between zero degrees and sixty degrees. In one example, the angle 1804 is between zero degrees and forty-five degrees.

Figure 20:
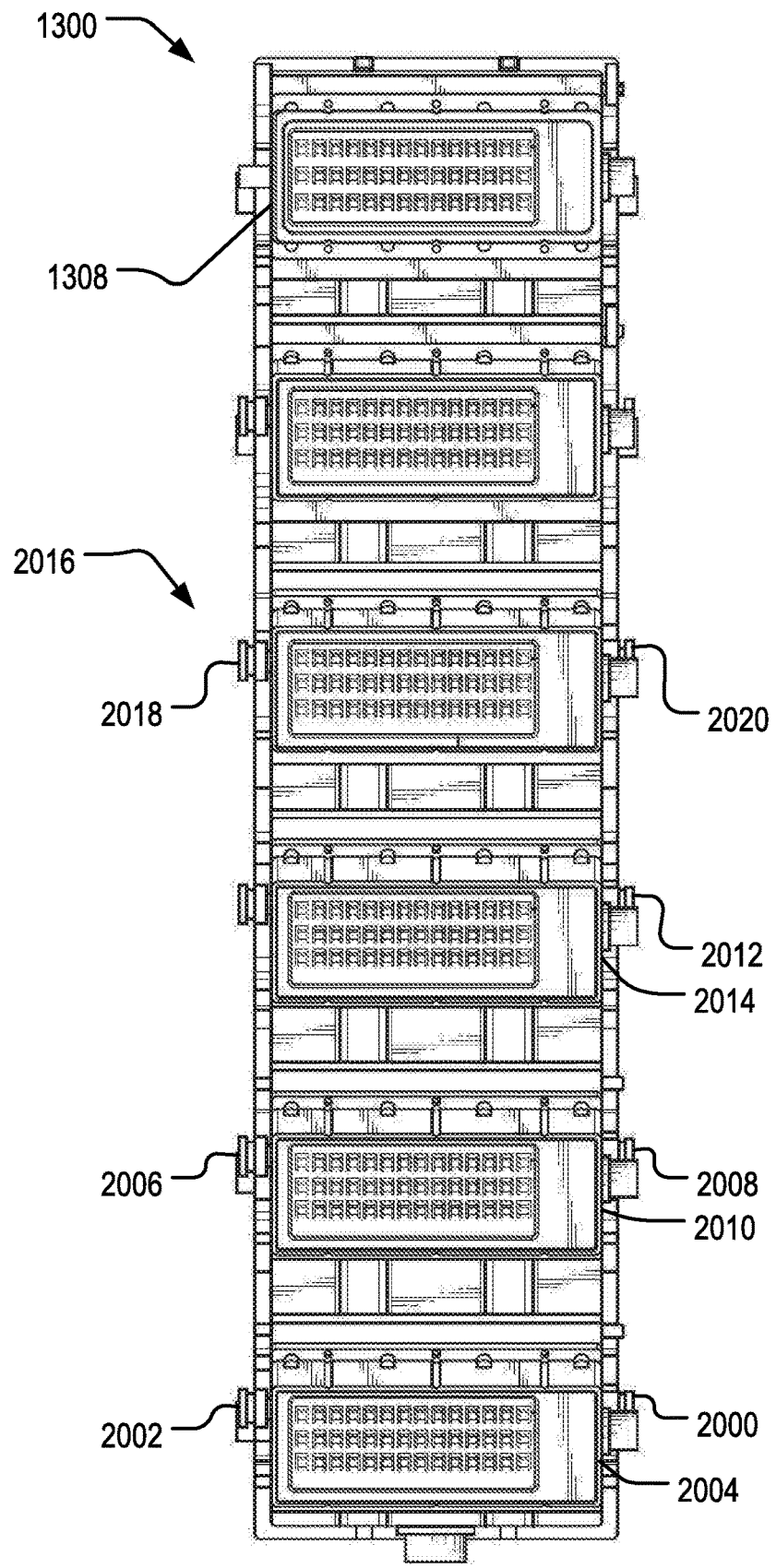
FIG. 20 is a top view of the light stack assembly according to another example of the present disclosure.

FIG. 20 is a top view of the light stack assembly 1300 according to another example of the present disclosure. Although six LED arrays 1308 are shown, it is within the scope of this disclosure to include any number of LED arrays 1308. Furthermore, the light stack assembly 1300 can be suspended from the ground, such that the light stack assembly 1300 does not touch the ground. In one example, not shown, the light stack assembly 1300 can be suspended from the ceiling via wires. In another example, not shown, the light stack assembly 1300 can be suspended by a frame taller than the light stack assembly 1300 and thus able to hold the light stack assembly 1300 off of the ground. Additionally, the light stack assembly can be mounted on a telescoping stand.

Figure 21:
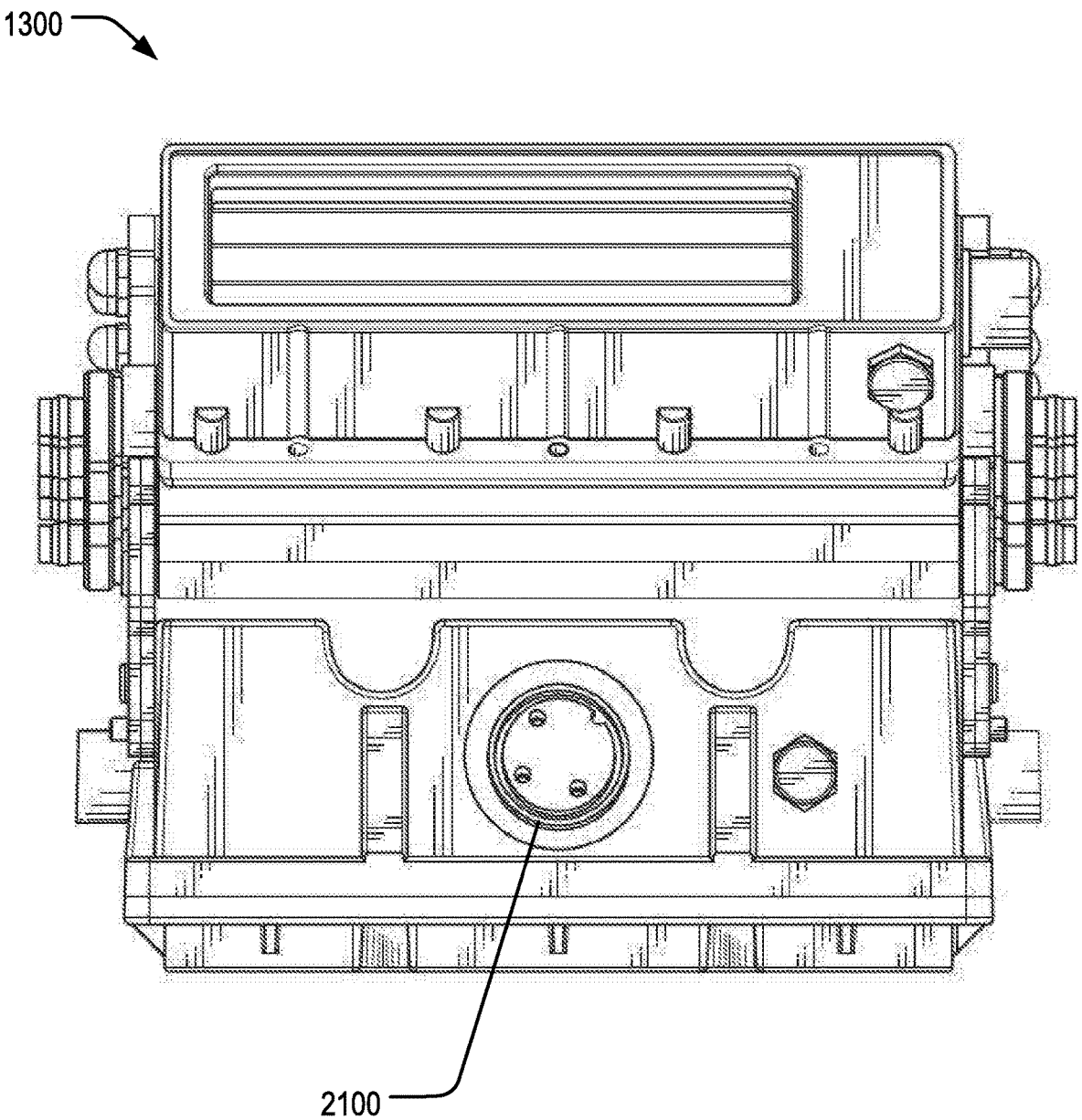
FIG. 21 is a front view of the light stack assembly according to another example of the present disclosure.

FIG. 21 is a front view of the light stack assembly 1300 according to another example of the present disclosure. The light stack assembly 1300 can include a power receiver 2000 configured to receive power from a power source to power the plurality of controllers 1800 and the plurality of LED arrays 1308. The power receiver 2100 can be a socket, for example. The power receiver 2000 can receive power from any power source such as, but not limited to, a battery, battery bank, generator, AC power source, DC power source, or the like. The power receiver 2000 can be a waterproof connection.

Figure 22:
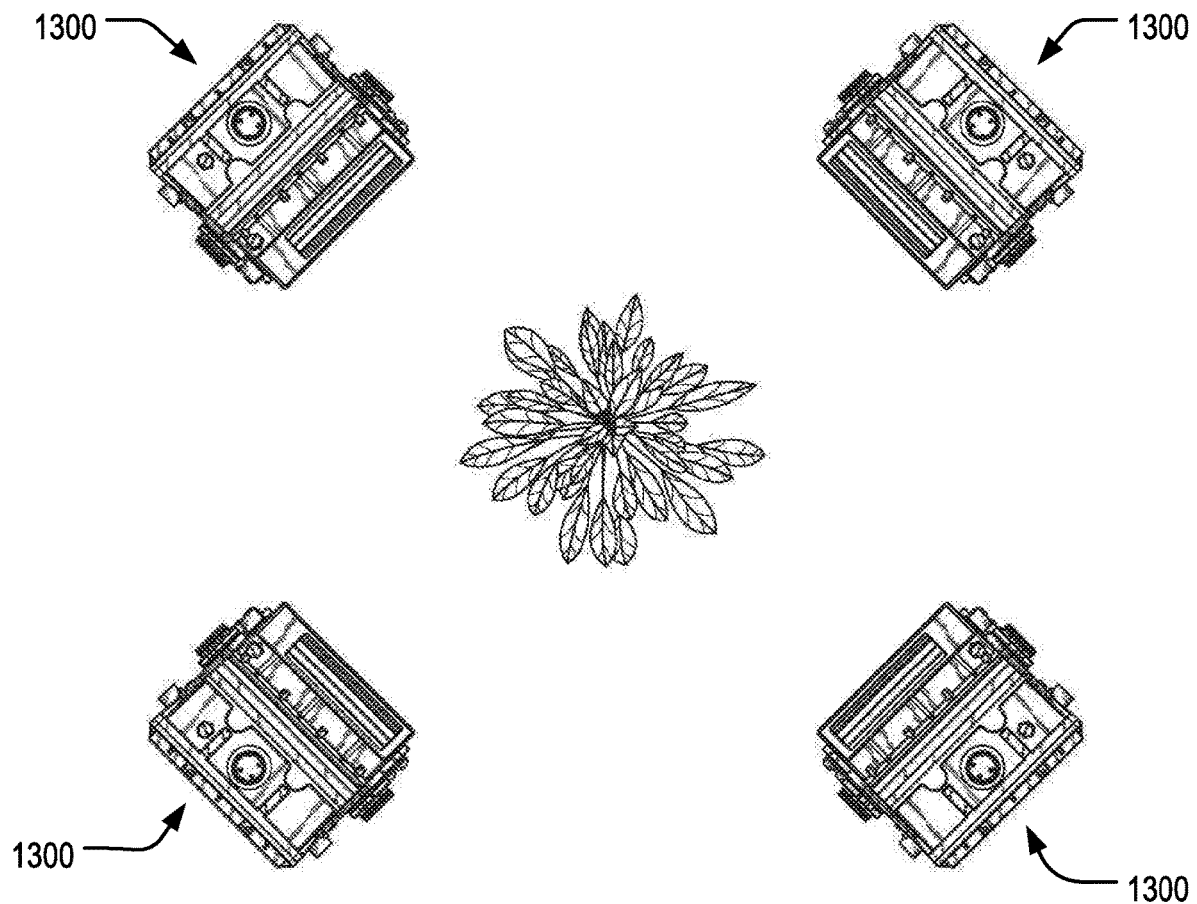
FIG. 22 is a top diagrammatic view of a plant and light arrangement according to the present disclosure.

FIG. 22 is a top diagrammatic view of a plant and light arrangement according to the present disclosure. A plurality of light stack assemblies 1300 can be arranged around an area of the plant in a light arrangement. In one example, four light stack assemblies 1300 are arranged equidistantly around the plant.

Figure 23:
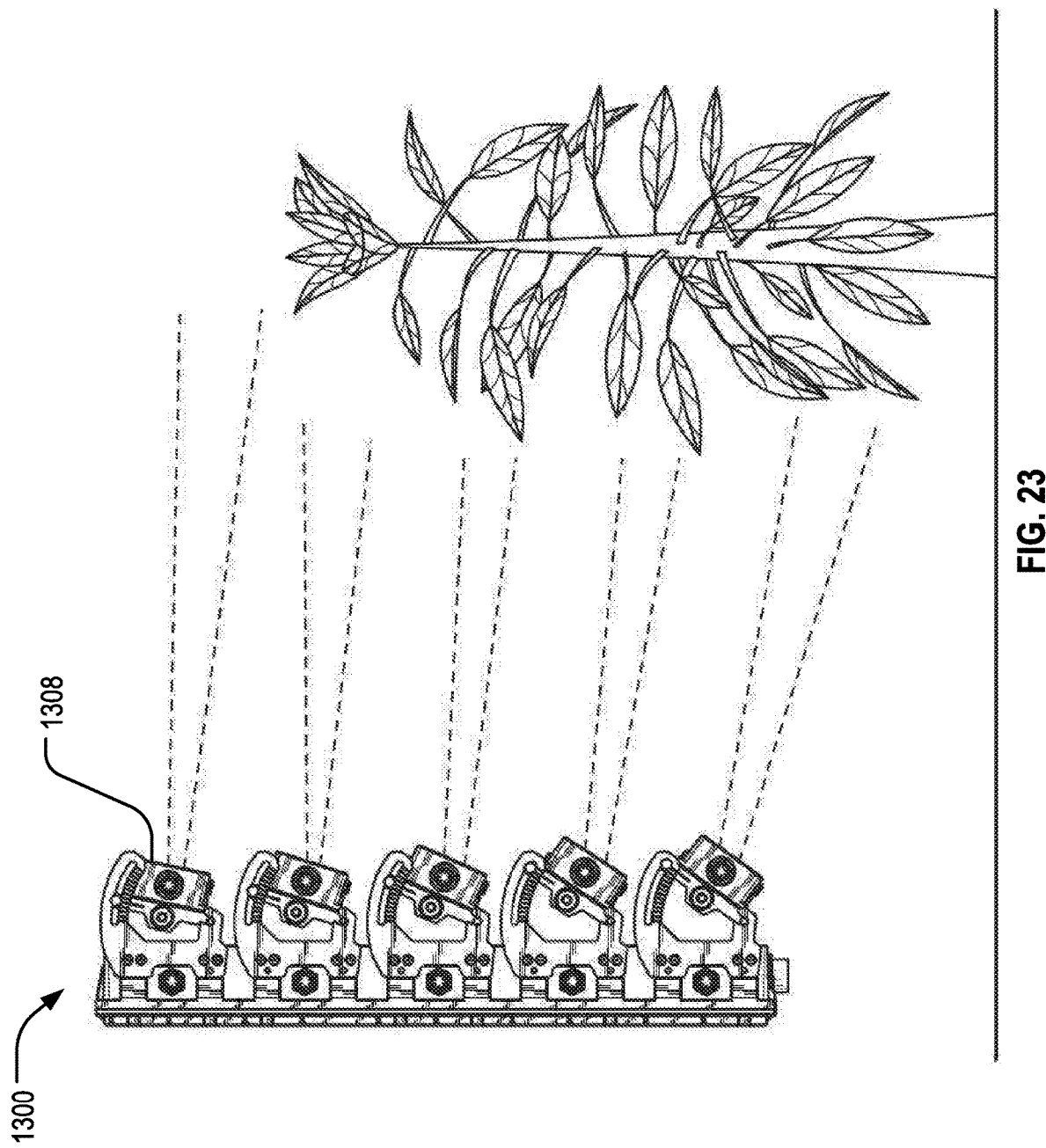
FIG. 23 a side diagrammatic view of a plant and light arrangement according to the present disclosure.

FIG. 23 a side diagrammatic view of a plant and LED arrangement according to the present disclosure. Each LED array of the plurality of LED arrays 1308 can be individually angled and adjusted, as previously described, to accommodate a specific grow plan for a plant. For example, the top LED array can point horizontally and shine light above the plant in order to encourage the plant to grow upwards. In the same example, the LED arrays closer to the bottom become more angled to produce light towards the bottom of a plant where it may have more leaves and thus, more ability to absorb light. The combination of the light arrangement and LED arrangement shown in FIGS. 21-22, which incorporate a plurality of light stack assemblies 1300 and a plurality of LED arrays 1308, can produce more productive plants in a shorter time span. While not illustrated, the LED arrangement can be suspended or elevated using one of the above devices. Furthermore, the LED arrays 1308 can be controlled as described above.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A light stack comprising:
    an elongate body having a length, the length extending from a proximal end to a distal end of the elongate body;
    a plurality of light emitting diode (LED) arrays adjustably coupled with the elongate body and arranged along the length thereof, wherein each of the plurality of LED arrays is operable to pivot thereby forming an angle relative to the length of the elongate body; and
    a control module coupled with the plurality of LED arrays, the control module configured to individually transition each of the plurality of LED arrays between a light emitting condition and a non-light emitting condition
    a plurality of proximity sensors coupled with the control module and arranged along the length of the elongate body, the plurality of proximity sensors configured to register an object within a predetermined distance, wherein the control module is operable to transition each of the plurality of LED arrays based on an adjacent proximity sensor of the plurality of proximity sensors.

2. The light stack of claim 1, wherein the control module transitions the plurality of LED arrays between the light emitting condition and the non-light emitting condition, whereby the LED array of the plurality of LED arrays adjacent to the proximal end is in a light emitting condition prior to an LED array toward the distal end.

3. The light stack of claim 1, wherein the control module transitions a corresponding one of the plurality of LED arrays to a light emitting condition based upon a command received from an external source.

4. The light stack of claim 1, wherein each of the plurality of LED arrays has a proximity sensor adjacent thereto.

5. The light stack of claim 1, wherein the control module transitions the plurality of LED arrays adjacent to any of the plurality proximity sensors registering an object within the predetermined distance.

6. The light stack of claim 1, wherein when plurality of proximity sensors registering an object within the predetermined distance between the proximal end and a middle of the elongate body, the control module transitions any of the plurality of LED arrays between the proximal end and the middle of the elongate body to a light emitting condition.

7. The light stack of claim 1, wherein each of the plurality of LED arrays comprises a lens module.

8. The light stack of claim 1, wherein the control module transitions each of the plurality of LED arrays from the non-light emitting condition to the light emitting condition after a predetermined length of time.

9. The light stack of claim 8, wherein the predetermined length of time is different for each of the plurality of LED arrays.

10. The light stack of claim 1, wherein the angle is between zero degrees and sixty degrees.

11. The light stack of claim 10, wherein the angle is about forty-five degrees.

12. The light stack of claim 1, wherein each of the plurality of LED arrays are substantially equally spaced from one another.

13. The light stack of claim 1, wherein a portion of the plurality of LED arrays at a proximal end are spaced closer together than a portion of the plurality of LED arrays at a distal end.

14. The light stack of claim 1, wherein the plurality of LED arrays are located on one side of the elongate body.

15. The light stack of claim 1, wherein the plurality of LED arrays are located on two or more sides of the elongate body.

16. The light stack of claim 1, further comprising a plurality of cooling assemblies, each of which is coupled to a corresponding one of the plurality of LED arrays.

17. The light stack of claim 16, wherein the cooling assembly comprises a cooling plate and a cooling port, wherein the cooling plate is configured to receive a cooling liquid via the cooling port.

18. The light stack of claim 1, wherein the control module comprises a plurality of controllers, wherein each controller corresponds to a corresponding one of the plurality of LED arrays and is positioned along the length of the elongate body, wherein each of the plurality of controllers communicate with each corresponding LED array of the plurality of LED arrays via a pair of pin connectors, wherein a first pin connector is positioned on the corresponding LED array and a second pin connector is positioned on the corresponding controller.

19. The light stack of claim 1, wherein the plurality of proximity sensors are substantially evenly spaced along the length of the elongate body.

20. A light stack comprising:
- an elongate body having a length, the length extending from a proximal end to a distal end of the elongate body;
- a plurality of light emitting diode (LED) arrays adjustably coupled with the elongate body and arranged along the length thereof, wherein each of the plurality of LED arrays is operable to pivot thereby forming an angle relative to the elongate body; and
- a control module coupled with the plurality of LED arrays, the control module configured to individually transition each of the plurality of LED arrays between a light emitting condition and a non-light emitting condition;
- a support structure having a pair of frames coupled to the elongate body, wherein each frame has a receiver protruding from the bottom of the frame, the receiver having an open slot, wherein each frame has a curvilinear limb, the curvilinear limb protruding from the top of the frame further than the receiver and curving towards the receiver, the curvilinear limb having a corresponding curvilinear closed slot.

* * * * *